(12) United States Patent
Gompert et al.

(10) Patent No.: US 8,930,040 B2
(45) Date of Patent: Jan. 6, 2015

(54) SYSTEMS AND METHODS FOR VIDEO CAPTURE, USER FEEDBACK, REPORTING, ADAPTIVE PARAMETERS, AND REMOTE DATA ACCESS IN VEHICLE SAFETY MONITORING

(71) Applicant: Zoll Medical Corporation, Chelmsford, MA (US)

(72) Inventors: Jeff M. Gompert, Newbury Park, CA (US); Chad Ashmore, Frederick, CO (US); William E. Durie, Jr., Newbury Park, CA (US); C. Shane Reid, Denver, CO (US)

(73) Assignee: Zoll Medical Corporation, Chelmsford, MA (US)

( * ) Notice: Subject to any disclaimer, the term of this patent is extended or adjusted under 35 U.S.C. 154(b) by 0 days.

(21) Appl. No.: 13/910,879

(22) Filed: Jun. 5, 2013

(65) Prior Publication Data

US 2013/0332004 A1     Dec. 12, 2013

Related U.S. Application Data

(60) Provisional application No. 61/656,527, filed on Jun. 7, 2012.

(51) Int. Cl.
| | | |
|---|---|---|
| *G06F 17/00* | (2006.01) | |
| *G07C 5/08* | (2006.01) | |
| *G07C 5/00* | (2006.01) | |

(52) U.S. Cl.
CPC ............... *G06F 17/00* (2013.01); *G07C 5/008* (2013.01); *G07C 5/0866* (2013.01)
USPC .......................................................... 701/1

(58) Field of Classification Search
CPC .................................................... G06F 17/00
USPC .......................................................... 701/1
See application file for complete search history.

(56) References Cited

U.S. PATENT DOCUMENTS

| | | |
|---|---|---|
| 5,085,224 A | 2/1992 | Galen et al. |
| 5,224,485 A | 7/1993 | Powers et al. |

(Continued)

FOREIGN PATENT DOCUMENTS

| | | |
|---|---|---|
| EP | 1538025 A1 | 6/2005 |
| WO | WO9221116 A1 | 11/1992 |

(Continued)

OTHER PUBLICATIONS

Chu, Yuechun et al., "A Mobile Teletrauma System Using 3G Networks," IEEE Transactions on Information Technology in Biomedicine, vol. 9, No. 4, Dec. 2004.

(Continued)

*Primary Examiner* — Thomas Tarcza
*Assistant Examiner* — Alex C Dunn
(74) *Attorney, Agent, or Firm* — Faegre Baker Daniels LLP

(57) ABSTRACT

A method for vehicle data management according to embodiments of the present invention includes receiving an accelerometer signal from an accelerometer mounted in a vehicle, determining an accelerometer specific force based on the accelerometer signal, receiving a speed signal from a speed sensor or GPS or other source on the vehicle, wherein the speed signal indicates a speed of the vehicle, determining an instantaneous acceleration of the vehicle by calculating a rate of change of the speed based on the speed signal, selecting a current observed acceleration as a lower value of the accelerometer specific force and the instantaneous acceleration, capturing video footage with a camera mounted on the vehicle, and flagging the video footage corresponding to a time when the current observed acceleration exceeds a preset safe force value.

20 Claims, 16 Drawing Sheets

(56) References Cited

U.S. PATENT DOCUMENTS

| | | | |
|---|---|---|---|
| 5,319,363 A | 6/1994 | Welch et al. | |
| 5,333,617 A | 8/1994 | Hafner | |
| 5,343,869 A | 9/1994 | Pross et al. | |
| 5,494,051 A | 2/1996 | Schneider, Sr. | |
| 5,511,553 A | 4/1996 | Segalowitz | |
| 5,531,472 A | 7/1996 | Semchena et al. | |
| 5,544,661 A | 8/1996 | Davis et al. | |
| 5,549,659 A | 8/1996 | Johansen et al. | |
| 5,570,127 A | 10/1996 | Schmidt | |
| 5,574,443 A | 11/1996 | Hsieh | |
| 5,593,426 A | 1/1997 | Morgan et al. | |
| 5,680,123 A | 10/1997 | Lee | |
| 5,782,878 A | 7/1998 | Morgan et al. | |
| 5,793,420 A | 8/1998 | Schmidt | |
| 5,959,529 A | 9/1999 | Kail | |
| 5,978,017 A | 11/1999 | Tino | |
| 6,002,326 A | 12/1999 | Turner | |
| 6,117,073 A | 9/2000 | Jones et al. | |
| 6,141,584 A | 10/2000 | Rockwell et al. | |
| 6,188,939 B1 | 2/2001 | Morgan et al. | |
| 6,211,907 B1 | 4/2001 | Scaman et al. | |
| 6,321,113 B1 | 11/2001 | Parker et al. | |
| 6,389,339 B1 | 5/2002 | Just | |
| 6,389,340 B1* | 5/2002 | Rayner | 701/32.4 |
| 6,390,996 B1 | 5/2002 | Halperin et al. | |
| 6,398,744 B2 | 6/2002 | Bystrom et al. | |
| 6,405,083 B1 | 6/2002 | Rockwell et al. | |
| 6,481,887 B1 | 11/2002 | Mirabella | |
| 6,526,219 B1 | 2/2003 | Posa et al. | |
| 6,532,381 B2 | 3/2003 | Bayer et al. | |
| 6,593,848 B1 | 7/2003 | Atkins | |
| 6,604,115 B1 | 8/2003 | Gary et al. | |
| 6,681,003 B2 | 1/2004 | Linder et al. | |
| 6,727,814 B2 | 4/2004 | Saltzstein et al. | |
| 6,747,556 B2 | 6/2004 | Medema et al. | |
| 6,827,695 B2 | 12/2004 | Palazzolo et al. | |
| 6,829,501 B2 | 12/2004 | Nielsen et al. | |
| 6,831,556 B1 | 12/2004 | Boykin | |
| 6,927,674 B2 | 8/2005 | Harter, Jr. et al. | |
| 6,937,150 B2 | 8/2005 | Medema et al. | |
| 6,950,013 B2 | 9/2005 | Scaman et al. | |
| 6,957,102 B2 | 10/2005 | Silver et al. | |
| 6,993,386 B2 | 1/2006 | Lin et al. | |
| 7,006,865 B1 | 2/2006 | Cohen et al. | |
| 7,092,802 B2 | 8/2006 | Baldassa | |
| 7,118,542 B2 | 10/2006 | Palazzolo et al. | |
| 7,120,488 B2 | 10/2006 | Nova et al. | |
| 7,122,014 B2 | 10/2006 | Palazzolo et al. | |
| 7,129,836 B2 | 10/2006 | Lawson et al. | |
| 7,162,306 B1 | 1/2007 | Caby et al. | |
| 7,172,300 B2 | 2/2007 | Plaster | |
| 7,202,792 B2 | 4/2007 | Zhang et al. | |
| 7,231,258 B2 | 6/2007 | Moore et al. | |
| 7,233,905 B1 | 6/2007 | Hutton et al. | |
| 7,295,871 B2 | 11/2007 | Halperin et al. | |
| 7,349,777 B2 | 3/2008 | Silverbrook | |
| 7,380,951 B2 | 6/2008 | Plaster | |
| 7,382,771 B2 | 6/2008 | Leblanc et al. | |
| 7,386,376 B2 | 6/2008 | Basir et al. | |
| 7,395,096 B2 | 7/2008 | Baratono et al. | |
| 7,412,395 B2 | 8/2008 | Rowlandson | |
| 7,425,889 B2 | 9/2008 | Widmann et al. | |
| 7,436,429 B2 | 10/2008 | Tillotson | |
| 7,444,315 B2 | 10/2008 | Wu | |
| 7,496,439 B2 | 2/2009 | McCormick | |
| 7,548,803 B2 | 6/2009 | MacCarthy | |
| 7,564,479 B2 | 7/2009 | Schedivy et al. | |
| 7,650,291 B2 | 1/2010 | Rosenfeld et al. | |
| 7,659,827 B2 | 2/2010 | Gunderson et al. | |
| 7,768,548 B2 | 8/2010 | Silvernail et al. | |
| 7,804,426 B2 | 9/2010 | Etcheson | |
| 7,830,962 B1* | 11/2010 | Fernandez et al. | 375/240.16 |
| 7,840,277 B2* | 11/2010 | Matos | 607/60 |
| 7,912,646 B2 | 3/2011 | McCarthy et al. | |
| 7,983,811 B2 | 7/2011 | Basir et al. | |
| 8,010,286 B2 | 8/2011 | Templeton et al. | |
| 8,045,685 B2 | 10/2011 | Lin et al. | |
| 8,054,168 B2 | 11/2011 | McCormick et al. | |
| 8,126,309 B2* | 2/2012 | Sakai | 386/239 |
| 8,149,108 B2 | 4/2012 | Hamel et al. | |
| 8,215,422 B2* | 7/2012 | Abel | 180/22 |
| 8,630,768 B2* | 1/2014 | McClellan et al. | 701/36 |
| 8,666,590 B2* | 3/2014 | Follmer et al. | 701/32.2 |
| 2001/0044732 A1 | 11/2001 | Maus et al. | |
| 2002/0004729 A1 | 1/2002 | Zak et al. | |
| 2002/0017405 A1 | 2/2002 | Nada | |
| 2004/0077995 A1 | 4/2004 | Ferek-Petric et al. | |
| 2005/0277872 A1 | 12/2005 | Colby, Jr. et al. | |
| 2005/0283438 A1* | 12/2005 | Brownewell et al. | 705/50 |
| 2006/0009809 A1 | 1/2006 | Marcovecchio et al. | |
| 2006/0149825 A1 | 7/2006 | Powell et al. | |
| 2006/0287586 A1 | 12/2006 | Murphy | |
| 2007/0100213 A1 | 5/2007 | Dossas et al. | |
| 2007/0118038 A1 | 5/2007 | Bodecker et al. | |
| 2007/0203742 A1 | 8/2007 | Jones et al. | |
| 2007/0255120 A1 | 11/2007 | Rosnov | |
| 2007/0276300 A1 | 11/2007 | Olson et al. | |
| 2007/0299689 A1 | 12/2007 | Jones et al. | |
| 2008/0018454 A1 | 1/2008 | Chan et al. | |
| 2008/0042813 A1 | 2/2008 | Wheatley et al. | |
| 2008/0126134 A1 | 5/2008 | Jones et al. | |
| 2008/0252412 A1 | 10/2008 | Larsson et al. | |
| 2009/0063187 A1 | 3/2009 | Johnson et al. | |
| 2009/0222539 A1 | 9/2009 | Lewis et al. | |
| 2009/0312998 A1* | 12/2009 | Berckmans et al. | 703/11 |
| 2010/0088010 A1* | 4/2010 | Verdejo et al. | 701/105 |
| 2010/0185341 A1 | 7/2010 | Wilson et al. | |
| 2010/0298899 A1 | 11/2010 | Donnelly et al. | |
| 2011/0117878 A1* | 5/2011 | Barash et al. | 455/404.2 |
| 2011/0124974 A1* | 5/2011 | Martin et al. | 600/300 |
| 2011/0133951 A1 | 6/2011 | Palmieri | |
| 2011/0263946 A1* | 10/2011 | El Kaliouby et al. | 600/300 |
| 2011/0295078 A1* | 12/2011 | Reid et al. | 600/300 |
| 2011/0295446 A1 | 12/2011 | Basir et al. | |
| 2012/0004804 A1* | 1/2012 | Beams et al. | 701/32.7 |
| 2012/0092497 A1 | 4/2012 | Hoetzer et al. | |
| 2013/0296719 A1* | 11/2013 | Packer et al. | 600/484 |
| 2013/0304146 A1* | 11/2013 | Aoyama et al. | 607/6 |
| 2014/0062118 A1* | 3/2014 | Bourgraf et al. | 296/19 |

FOREIGN PATENT DOCUMENTS

| | | |
|---|---|---|
| WO | WO2006086089 A1 | 8/2006 |
| WO | 2012026922 A1 | 3/2012 |

OTHER PUBLICATIONS

Correspondence from Barry Chapin to Benjamin Fernandez dated Jan. 7, 2013.

Gagliano, et al., "Wireless Ambulance Telemedicine May Lessen Stroke Morbidity," Telemedicine Today, [online] [retrieved on Aug. 30, 2013] retrieved from http://www2.telemedtoday.com/articles/wirelessambulance.shtml.

Google search for the term "transmission of electrocardiograms from a moving ambulance", [retrieved on Sep. 10, 2013] retrieved from https://www.google.com/search?q=transmission+of+electrocardio-grams+from+a+moving+ambulance&oq=transmission+of+electro-cardiograms+fro&aqs=chrome.1.69i57j0.12049j0&sourceid=chrome&ie=UTF-8.

Imielinski, et al. (Eds), Mobile Computing, Kluwer Academic Publishers, 2000, 1996 [online] [retrived on Sep. 12, 3013] retrieved from Google Books at http://books.google.com/books?id=gx3HVwcE0ZAC&pg=PA624&dq=portable+medical+locating+a+portable+wireless+communication+network&hl=en&sa=X&ei=5XfAUaXqGsbn0QGMloHoCw&ved=0CBsQ6AEwAQ#v=onepage&q=portable%20medical%20locating%20a%20portable%20wireless%20communication%20network&f=false.

International Search Report and Written Opinion issued in PCT/US2013/44357, mailed Feb. 3, 2014, 44 pages.

Jain et al., "Towards a Comprehensive Technology for Recording and Analysis of Mulitple Physiological Parameters within their Behavioral and Environmental Context," [online] [retrieved on Aug. 23,

(56) References Cited

OTHER PUBLICATIONS

2013]. Retrieved from http://www.psych-methoden.uni-koeln.de/mitarbeiter/jain/jain-6.htm.

Johnson, et al., "Remote Physiological Monitoring in the Home," in: Medical Informatics Europe '96: Human Facets in Information Technology (IOS Press, 1996, pp. 63-66).

Konoske, et al., "Evaluation of the Mobile Medical Monitor (M3) at Forward Levels of Care," Naval Health Research Center, Technical Document No. 98-2B, dated Feb. 2, 1999.

Lee, et al., "Informatics in Prehospital Care," Trauma Informatics Computers in Health Care 1998, pp. 31-44 (abstract).

Nam, "Development of remote diagnosis system integrating digital telemetry for medicine," Engineering in Medicine and Biology Society, 1998. Proceedings of the 20th Annual International Conference of the IEEE (vol. 3) (abstract).

Pahlavan, Kaveh et al., An Overview of Wireless Indoor Geolocation Techniques and Systems, C.G. Omidyar (Ed.): MWCN 2000, LNCS 1818, pp. 1-13, Springer-Verlag Berlin Heidelberg 2000.

Pavlopoulos, et al., "'Ambulance'—mobile unit for health care provision via telmatics support," Engineering in Medicine and Biology Society, 1996 Bridging Disciplines for Biomedicine. Proceedings of the 18th Annual International Conference of the IEEE (vol. 3) (abstract).

Poor, Robert, "Wireless Mesh Networks," Sensors, Feb. 1, 2003, retrieved on Aug. 2, 2012 from http://www.sensorsmag.com/networking-communications/standards-protocols/wireless-mesh-networks-968.

Schaldach, "Pacemaker Technology," Electrotherapy of the Heart, 1992, pp. 47-72 (abstract).

ScienceDaily, "Telemedicine on Ambulances May Save Stroke Patients," Feb. 6, 1998 [online] [retrieved Aug. 23, 2013] [retrieved from http://www.sciencedaily.com/releases/1998/02/980206071314.htm.

Weiss, "Implications of silicon monolithic RFICs for medical instrumentation and telemetry," Silicon Monolithic Integrated Circuits in RF Systems, 1998. Digest of Papers, Sep. 18, 1998 (abstract).

ZOLL Data systems, ePCR Suite 5.0.2 Release Notes, 2 pages, Feb. 15, 2008.

ZOLL Data Systems, Hardware and Software Specifications, RescueNet Tablet PCR(TM), Tablet PCR Version 4.04, 22 pages, Nov. 2006.

ZOLL Data Systems, RescueNet ePCR Suite 4.04 to 5.0.2 Upgrade Guide, 83 pages, Apr. 14, 2008.

ZOLL Data Systems, RescueNet ePCR Suite 5.0 Hardware and Software Specifications Version 5.0, 33 pages, Jan. 24, 2014.

ZOLL Data Systems, RescueNet ePCR Suite 5.0 Install Guide, 70 pages, Jun. 25, 2007.

ZOLL Data Systems, RescueNet ePCR Suite 5.0 Install Guide, for new installs of RescueNet ePCR Suite Version 5.0.1.x, 84 pages, Nov. 28, 2007.

ZOLL Data Systems, RescueNet ePCR Suite 5.0.1 Upgrade Guide, 82 pages, Nov. 16, 2007.

ZOLL Data Systems, RescueNet ePCR Suite 5.0.2 Install Guide, 83 pages, Apr. 14, 2008.

ZOLL Data Systems, RescueNet ePCR Suite Security Overview, 4 pages, Feb. 5, 2008.

ZOLL Data Systems, RescueNet ePCR Suite Upgrade Guide, applies to upgrades of RescueNet ePCR Suite 5.0.1 to version 5.0.2, 28 pages, Apr. 14, 2008.

ZOLL Data Systems, RescueNet ePCR User and Administration Guide, Software version 5.00 Manual 1.00 revision 0, Chapters 1-34, 588 pages, 2007.

ZOLL Data Systems, RescueNet Field Data Administrator's Guide, Software version 4.04 Manual 4.0 revision 4, 282 pages, 2006.

ZOLL Data Systems, RescueNet Tablet PCR 4.04 Install Guide, 30 pages, Nov. 15, 2006.

ZOLL Data Systems, RescueNet Tablet PCR User's Guide, Software version 5.0 Manual 5.0 revision 1, 102 pages, 2007.

ZOLL Data Systems, RescueNet TabletPCR 4.04 Known Issues, 1 page, Dec. 5, 2006.

ZOLL Data Systems, RescueNet TabletPCR User's Guide, Software version 4.04 Manual 4.0 revision 4, 100 pages, 2006.

ZOLL Data Systems, TabletPCR Version 4.04 Upgrade Guide, 28 pages, Nov. 15, 2006.

ZOLL Data Systems, Workflow Editor User's Guide, Software version 5.00 Manual 1.00 revision 0, 40 pages, 2007.

Zoorob, Roger J., "Acute Dyspnea in the Office," American Family Physician, Nov. 1, 2003, retrieved on Aug. 2, 2012 from http://www.aafp.org/afp/2003/1101/p1803.html?printable=afp.

* cited by examiner

LAST DOWNLOAD REPORT

REPORT DATE: 03/03/10 TIME: 11:29:53

| DATE | TIME | VAR | VEHICLE | ODOM | DIST | UNKN.DST | B.LOW | FIRMW | EXC |
|------|------|-----|---------|------|------|----------|-------|-------|-----|
| 02/09/10 | 08:19:24 | -C | 76 | 94577.1 | 0.01 | | | 4.26L | S |
| 02/22/10 | 08:00:14 | -C | 98 | 158646.2 | 0.06 | | 1 | 4.26L | |
| 03/03/10 | 00:03:52 | | 68 | 60423.9 | 95.21 | 5.12 | | 4.26L | |

FIG.8

| PRINT | TO FILE |

DRIVER TRIP SUMMARY REPORT
RESCUENET ROAD SAFETY

REPORT DATE: AUG 17 2009        FROM:   08/13/09 16:14:05
FILE NAME:   LRVRAU14.9A1       TO:     08/14/09 08:48:23
VEHICLE:     LRVR               DRIVER ID: 00027
ODOMETER:    40089.76           NAME:   SMITH, ROBERT
DRIVER MILES 14.06

SECTION 1 - VEHICLE OPERATIONS

| | | | |
|---|---|---|---|
| HIGH OVERFORCE COUNT | 2 | HARD ACCELERATIONS | 4 |
| TOTAL OVERFORCE COUNT | 19 | HARD DECELERATIONS | 1 |
| HIGHEST OVERFORCE % | 72% | MOVING OVER RPM'S | 1 |
| HIGH OVERSPEED COUNT | 54 | HIGHEST MOVING OVER RPM | 4770 |
| TOTAL OVERSPEED COUNT | 131 | IDLING OVER RPM'S | 0 |
| HIGHEST OVERSPEED (MPH) | 84 | HIGHEST IDLING OVER RPM | 0 |
| UNSAFE REVERSES | 0 | EXCESS IDLES | 0 |
| SEATBELT VIOLATIONS | 1 | BATTERY LOWS | 0 |
| % OF DISTANCE BRAKES APPLIED | 15.6% | LONGEST BATTERY LOW | 0:00:00 |

SECTION 2 - UTILIZATION

| | H:M:S | % RUN TIME |
|---|---|---|
| RUN TIME | 0:26:42 | 100.0 |
| MOVE TIME | 0:26:00 | 97.4 |
| IDLE TIME | 0:00:42 | 2.6 |
| EXCESS IDLE TIME | 0:00:00 | 0.0 |

| | | | |
|---|---|---|---|
| LONGEST EXCESS IDLE | 0:00:00 | LONGEST DAILY RUN TIME | 0:10:09 |
| AVERAGE EXCESS IDLE | 0:00:00 | AVERAGE DAILY RUN TIME | 0:05:12 |

SECTION 3 - VEHICLE SETTINGS

| | | | |
|---|---|---|---|
| LOW NON-EMERG OVERSPEED | 76 MPH | HARD ACCELERATION | 9 FT/S/S |
| HIGH NON-EMERG OVERSPEED | 81 MPH | HARD DECELERATION | -11 FT/S/S |
| LOW EMERG OVERSPEED | 76 MPH | EXCESS IDLE TIME | 30 SEC |
| HIGH EMERG OVERSPEED | 81 MPH | IDLING OVER RPM | 1800 RPM |
| OVERSPEED TIME | 10 SEC | IDLING OVER RPM TIME | 2 SEC |
| LOW OVERFORCE | 40 % | MOVING OVER RPM | 4500 RPM |
| HIGH OVERFORCE | 56 % | MOVING OVER RPM TIME | 2 SEC |
| SPEED CALIBRATION | 9.9 | RPM CALIBRATION | 70.0 |
| ODOMETER CALIBRATION | 9.9 | | |

FIG.9

| PRINT | TO FILE | ODOMETER | DISTANCE | DELTA | SPD/RPM | GRAPHICS | TEXT |
|---|---|---|---|---|---|---|---|

INPUT EVENTS REPORT - SEATBELT
ROAD SAFETY INTERNATIONAL

REPORT DATE: AUG 17 2009                          FROM: 08/13/09 16:14:05
FILE NAME:   LRVRAU14.9A1                         TO    08/14/09 08:48:23
VEHICLE:     LRVR                                 MEMORY OVERWRITES: 0
ODOMETER:    40089.76
0: IGNITO 3: BRAKE 5: REVERSE 6: P.BRAKE 9: SEATBEL A: IGNITO C: BRAKE2 D: REVERSE
E: P.BRAKE F: SEATBEL

```
                                                                    HHOOOSIM
    OCCURRENCE   TIME      ELAPSED    ODOMETER     DRV ID  03569ACDEF ADFSRTDV
1:  08/13/09    17:33:11   0:00:12   40077.06 MI   00001   +...+......+
2:  08/14/09    08:46:01   0:00:25   40089.67 MI   00001   ++...++...  ......+
```

FIG. 10

| PRINT | TO FILE | ODOMETER | DISTANCE | DELTA |

OVERSPEED REPORT
RESCUENET ROAD SAFETY

REPORT DATE: AUG 17 2009                                            FROM: 08/13/09 16:14:05
FILE NAME:   LRVRAU14.9A1                                           TO    08/14/09 08:48:23
VEHICLE:     LRVR                                                   MEMORY OVERWRITES: 0
ODOMETER:    40089.76
TOTAL OVERSPEED TIME: 0:02:11    OCCURRENCES: 5    AVG. OVERSPEED: 0:00:26

| OCCURRENCE TIME | TOTAL (HMS) | HIGH (HMS) | MAX O.S. | ODOMETER | EMPLOYEE |
|---|---|---|---|---|---|
| 1: 08/14/09 08:03:46 | 0:00:35 | 0:00:12 | 82 NE | 40080.77 | 00001 |
| 1: 08/14/09 08:21:14 | 0:00:30 | 0:00:00 | 80 NE | 40084.85 | 00001 |
| 1: 08/14/09 08:21:55 | 0:00:28 | 0:00:12 | 83 NE | 40085.71 | 00001 |

FIG. 11

QUERY FILE: CUSTOM
REPORTED: 12/6/2010

RESCUENET ROAD SAFETY

FROM: 11/15/2010
TO: 11/30/2010

DRIVER SAFETY SUMMARY (EMERGENCY & NON-EMERGENCY DRIVING)

| DRIVER ID | DRIVER | DISTANCE | FORCE COUNTS | | OVER SPEED COUNTS | | | SEATBELT COUNTS | UNSAFE REVERSE | ABC MILES | LEVEL |
|---|---|---|---|---|---|---|---|---|---|---|---|
| | | | TOTAL | HIGH | TOTAL | HIGH | | | | | |
| 00002 | ANDERSON, KELLY | 365.6 | 0 | 0 | 0 | 0 | | 0 | 0 | | |
| 00010 | SMITH, IAN | 273.7 | 2 | 0 | 0 | 0 | | 0 | 0 | 136,849 | 4 |
| 00005 | OLIVER, DANNY | 381.9 | 16 | 0 | 0 | 0 | | 2 | 0 | 21,217 | 4 |
| | | | | | STANDARD LINE | | | | | | |
| 00004 | GREELEY, RICK | 162.8 | 9 | 1 | 0 | 0 | | 3 | 1 | 4,284 | 6 |
| 00003 | ROGERS, SALLY | 170.9 | 0 | 0 | 40 | 0 | | 3 | 2 | 3,798 | 7 |
| TOTAL DRIVERS: | | 5 | | | | | | | | | |
| FLEET TOTALS: | | 1,354.9 | 27 | 1 | 40 | 0 | | 8 | 3 | 17,151 | |
| AVERAGE DRIVER: | | 271.0 | 5 | 1 | 8 | 0 | | 2 | 1 | | |

FIG. 13

SYSTEMS AND METHODS FOR VIDEO CAPTURE, USER FEEDBACK, REPORTING, ADAPTIVE PARAMETERS, AND REMOTE DATA ACCESS IN VEHICLE SAFETY MONITORING

CROSS-REFERENCE TO RELATED APPLICATIONS

This application claims the benefit of U.S. Provisional Patent Application Ser. No. 61/656,527, filed on Jun. 7, 2012, which is incorporated herein by reference in its entirety for all purposes.

TECHNICAL FIELD

Embodiments of the present invention relate generally to vehicle safety monitoring, and more particularly to video capture, user feedback, reporting, adaptive parameters, and remote data access in vehicle safety monitoring.

BACKGROUND

Companies which control and operate vehicles, for example emergency response vehicles, are often interested in knowing how safely those vehicles are being operated, as well as identifying and documenting any problems with driver behavior. These companies may opt to provide their drivers with feedback during a driver safety violation, and may also opt to document such information over time, in order to compile a report about individual drivers or the companies' drivers as a whole. Information about driver behavior and vehicle safety conditions may also be used to investigate vehicle crashes or other safety events after they have occurred.

Although vehicle safety monitoring systems can improve driving behavior, the types of driver feedback and the level of detail that can be collected for later use are relatively limited for emergency response vehicles. Some such systems may collect video data related to particular safety violation events, for example too rapidly accelerating or decelerating. However, such systems are often incapable of collecting video data that has been triggered or flagged by conditions unrelated or only partially related to the driver's behavior. Current vehicle safety monitoring systems also often do not provide easy access to the data collected on board the vehicle, and often do not permit dynamic creation of reports based on current and past vehicle safety data.

SUMMARY

In Example 1, a method for vehicle data management according to embodiments of the present invention includes receiving an accelerometer signal from an accelerometer mounted in a vehicle, determining an accelerometer specific force based on the accelerometer signal, receiving a speed signal from a speed sensor on the vehicle, wherein the speed signal indicates a speed of the vehicle, determining an instantaneous acceleration of the vehicle by calculating a rate of change of the speed based on the speed signal, selecting a current observed acceleration as a lower value of the accelerometer specific force and the instantaneous acceleration, capturing video footage with a camera mounted on the vehicle, and flagging the video footage corresponding to a time when the current observed acceleration exceeds a preset safe force value.

In Example 2, the method of Example 1, wherein the vehicle includes a front cabin and a rear cabin, wherein the camera is mounted in the rear cabin, and wherein capturing video footage includes capturing video footage including at least a portion of a patient in the rear cabin.

In Example 3, the method of any of Example 1 or Example 2, wherein the vehicle includes a front cabin and a rear cabin, wherein the camera is mounted in the rear cabin, and wherein capturing video footage includes capturing video footage including at least a portion of an emergency services technician in the rear cabin.

In Example 4, the method of any of Examples 1-3, wherein the time is a range of time when the current observed acceleration exceeds a present safe force value.

In Example 5, the method of any of Examples 1-4, further including flagging the video footage corresponding to a time when the speed exceeds a preset safe speed value.

In Example 6, the method of any of Examples 1-5, further including receiving a reverse signal from a reverse activation indicator, the reverse signal indicating whether the vehicle is in reverse drive, receiving a spotter switch signal from a spotter switch, the spotter switch signal indicating whether a spotter is present behind the vehicle, and flagging the video footage corresponding to a time when the vehicle is in reverse drive and a spotter is not present.

In Example 7, the method of any of Examples 1-6, wherein the camera is mounted on or near a rear of the vehicle facing in a rearward direction.

In Example 8, a system for vehicle data management according to embodiments of the present invention includes an accelerometer, wherein the accelerometer is mounted in a vehicle and is configured to measure an accelerometer specific force of the vehicle, a speed sensor, wherein the speed sensor is configured to measure a speed of the vehicle, a video capture device, a vehicle data management device communicably coupled to the accelerometer, the speed sensor, and the video capture device, the vehicle data management device configured to establish a vehicle record, wherein the vehicle record includes video footage captured by the video capture device, wherein the vehicle data management device is further configured to determine an instantaneous acceleration based on a rate of change of the speed of the vehicle, determine a current observed acceleration as a lower value of the accelerometer specific force and the instantaneous acceleration, and mark the vehicle record to indicate a time when the instantaneous acceleration exceeds a preset safe force value.

In Example 9, the system of Example 8, wherein the vehicle record includes the video footage in a vehicle video record, and wherein the vehicle data management device is further configured to mark the vehicle video record to indicate a time when the force value is outside of the safe force range.

In Example 10, the system of any of Example 8 or Example 9, wherein the vehicle data management device is further configured to mark the vehicle video record to indicate range of time when the force value is outside of the safe force range.

In Example 11, a method according to embodiments of the present invention includes simultaneously displaying a map showing a route taken by a particular emergency vehicle during an emergency medical services event and a representation of the vehicle at a position along the route, and displaying visual data captured from the emergency vehicle during the emergency medical services event corresponding to a time at which the vehicle was at the position along the route.

In Example 12, the method of Example 11, wherein the visual data is video footage, wherein displaying the visual data includes playing the video footage, the method further including synchronizing moving the representation of the vehicle along the route to correspond to the vehicle position at the time represented by the playing video footage.

In Example 13, the method of Example 11 or Example 12, wherein the position is a first position, the method further including receiving a request to move the representation of the vehicle to a second position along the route, updating the map to show the representation of the vehicle at the second position, and based on the request, displaying the visual data corresponding to the time at which the vehicle was at the second position.

In Example 14, a system for vehicle data management according to embodiments of the present invention includes a driver identification device located on an emergency vehicle, the driver identification device configured to receive an indication of an identity of a current driver of the emergency vehicle, wherein the emergency vehicle has a front cabin configured to seat the current driver, and a rear cabin configured to accept a patient and at least one emergency medical technician, an accelerometer located on the emergency vehicle, the accelerometer configured to indicate a specific force undergone by the emergency vehicle, a speed sensing device located on the emergency vehicle, the speed sensing device configured to indicate a speed of the emergency vehicle, a video capture device located in the rear cabin and configured to capture visual information about the rear cabin, and a vehicle data management device communicably coupled to the driver identification device, the accelerometer, the speed sensing device, and the video capture device, the vehicle data management device configured to establish a vehicle record, wherein the vehicle record includes video footage captured by the video capture device, wherein the vehicle data management device is further configured to determine whether one or both of the specific force and the speed fall outside of certain ranges, and create a flag in the vehicle record based on the determination.

In Example 15, the system of Example 14, wherein the video capture device is a first video capture device, and wherein the driver identification device is a second video capture device located in the front cabin and configured to receive visual information about the current driver.

In Example 16, the system of Example 14 or Example 15, wherein the driver identification device is a magnetic card reader.

In Example 17, the system of any of Examples 14-16, wherein the driver identification device is an RFID transceiver.

In Example 18, the system of any of Examples 14-17, further including a seatbelt sensor configured to indicate fastening of a seatbelt, the vehicle data management device further configured to determine whether the seatbelt is not fastened, and create the flag in the vehicle record based on the determination.

In Example 19, the system of any of Examples 14-18, further including a spotter switch configured to indicate presence of a backing spotter, and a reverse activation signal configured to indicate whether the vehicle is in reverse drive, the vehicle data management device further configured to determine whether the backing spotter is not present, and create the flag in the vehicle record based on the determination.

In Example 20, the system of any of Examples 14-19, further including an audio device, wherein the vehicle data management device is further configured to play an audio message with the audio device based on the determination.

In Example 21, a system for vehicle data management according to embodiments of the present invention includes a specific force sensing device located on an emergency vehicle, the specific force sensing device configured to indicate a specific force undergone by the emergency vehicle, wherein the emergency vehicle has a front cabin configured to seat a driver, and a rear cabin configured to accept a patient and at least one emergency medical technician, a speed sensing device located on the emergency vehicle, the speed sensing device configured to indicate a speed of the emergency vehicle, a video capture device located in the emergency vehicle and configured to capture visual information about one or more of the emergency vehicle, the driver, the patient, and the at least one emergency medical technician, and a vehicle data management device communicably coupled to the specific force sensing device, the speed sensing device, and the video capture device, the vehicle data management device configured to establish a vehicle record, wherein the vehicle record includes video footage captured by the video capture device, wherein the vehicle data management device is further configured to determine whether a particular safety situation exists with the emergency vehicle based on the visual information, select a speed limit and a specific force limit, wherein the speed limit and the specific force limit are both lower if it is determined that the particular safety situation exists, and are both higher if it is not determined that the particular safety situation exists, calculate whether one or both of the speed is higher than the speed limit and the specific force is higher than the specific force limit, and create a flag in the vehicle record based on the calculation.

In Example 22, the system of Example 21, wherein the vehicle data management device is configured to automatically determine whether the particular safety situation exists based on the visual information.

In Example 23, the system of Example 21 or Example 22, wherein the vehicle data management device is configured to prompt the driver or the at least one emergency medical technician to confirm that a safety situation exists based on the visual information.

In Example 24, the system of any of Examples 21-23, wherein the video capture device is located in the rear cabin, and wherein the safety situation is a person standing in the rear cabin.

In Example 25, the system of any of Examples 21-24, wherein the video capture device is located in the rear cabin, and wherein the safety situation is a patient laying in the rear cabin.

In Example 26, the system of any of Examples 21-25, wherein the vehicle is a first vehicle, wherein the video capture device is located externally of the first vehicle at or near a rear of the first vehicle, and wherein the safety situation is a second vehicle following too closely to the first vehicle.

In Example 27, the system of any of Examples 21-26, wherein the vehicle is a first vehicle, wherein the video capture device is located externally of the first vehicle at or near a front of the first vehicle, and wherein the safety situation is the first vehicle following too closely to a second vehicle.

In Example 28, the system of any of Examples 21-27, wherein the vehicle data management device is further configured to interpret gestures captured by the video capture device and to determine whether a particular safety situation exists with the emergency vehicle by interpreting the gestures.

In Example 29, the system of any of Examples 21-28, wherein the specific force sensing device is an accelerometer.

In Example 30, a method for vehicle data management according to embodiments of the present invention includes receiving a specific force value from a specific force sensing device located on an emergency vehicle, the specific force value indicating a specific force undergone by the emergency vehicle, receiving a speed value from a speed sensing device located on the emergency vehicle, receiving visual information from a visual capture device located on the emergency vehicle, wherein the visual information includes visual information about one or more of the emergency vehicle, the driver, the patient, and the at least one emergency medical technician, establishing a vehicle data record including at least a portion of the visual information, determining whether a particular safety situation exists with the emergency vehicle based on the visual information, selecting a speed limit and a specific force limit, wherein the speed limit and the specific force limit are both lower if it is determined that the particular safety situation exists, and are both higher if it is not determined that the particular safety situation exists, calculating whether one or both of the speed is higher than the speed limit and the specific force is higher than the specific force limit, and creating a flag in the vehicle record based on the calculation.

In Example 31, the method of Example 30, wherein determining whether the particular safety situation exists includes automatically determining whether the particular safety situation exists based on the visual information.

In Example 32, the method of Example 30 or Example 31, further comprising prompting the driver or the at least one emergency medical technician to confirm that a safety situation exists based on the visual information.

In Example 33, the method of any of Examples 30-32, wherein the video capture device is located in the rear cabin, and wherein the safety situation is a person standing in the rear cabin.

In Example 34, the method of any of Examples 30-33, wherein the video capture device is located in the rear cabin, and wherein the safety situation is a patient laying in the rear cabin.

In Example 35, the method of any of Examples 30-34, wherein the vehicle is a first vehicle, wherein the video capture device is located externally of the first vehicle at or near a rear of the first vehicle, and wherein the safety situation is a second vehicle following too closely to the first vehicle.

In Example 36, the method of any of Examples 30-35, wherein the vehicle is a first vehicle, wherein the video capture device is located externally of the first vehicle at or near a front of the first vehicle, and wherein the safety situation is the first vehicle following too closely to a second vehicle.

In Example 37, the method of any of Examples 30-36, wherein the visual information comprises gestures, and wherein determining whether the particular safety situation exists comprises automatically interpreting the gestures.

In Example 38, the method of any of Examples 30-37, wherein the specific force sensing device is an accelerometer.

In Example 39, a system for vehicle data management according to embodiments of the present invention includes a specific force sensing device located on an emergency vehicle, the specific force sensing device configured to indicate a specific force undergone by the emergency vehicle, a speed sensing device located on the emergency vehicle, the speed sensing device configured to indicate a speed of the emergency vehicle, a condition indicator located on the emergency vehicle, the condition indicator configured to indicate information about presence or absence of a condition, a vehicle data management device communicably coupled to the specific force sensing device, the speed sensing device, and the condition indicator, wherein the vehicle data management device is configured to establish a vehicle record, and is further configured to determine whether the condition is present or absent based on the information from the condition indicator, adjust a speed limit and a specific force limit based on the determination, and create a flag when one or both of the speed is higher than the speed limit and the specific force is higher than the specific force limit.

In Example 40, a method for vehicle data management according to embodiments of the present invention includes receiving a specific force value from a specific force sensing device located on an emergency vehicle, the specific force value indicating a specific force undergone by the emergency vehicle, receiving a speed value from a speed sensing device located on the emergency vehicle, receiving information about presence of absence of a condition from a condition indicator, establishing a vehicle data record, determining whether the condition is present or absent based on the information from the condition indicator, adjusting a speed limit and a specific force limit based on the determination, and creating a flag in the vehicle record when one or both of the speed is higher than the speed limit and the specific force is higher than the specific force limit.

In Example 41, the method of Example 40, wherein creating the flag in the vehicle record comprises creating the flag in the vehicle record when one or both of the speed is higher than the speed limit and the specific force is higher than the specific force limit for a preset grace period time.

In Example 42, the method of Example 40 or Example 41, wherein the condition indicator is a windshield wiper indicator, wherein adjusting the speed limit and the specific force limit comprises lowering the speed limit and the specific force limit.

In Example 43, the method of any of Examples 40-42, wherein the condition indicator is and emergency siren indicator, wherein adjusting the speed limit and the specific force limit comprises raising the speed limit and the specific force limit.

In Example 44, the method of any of Examples 40-43, wherein the condition indicator is an emergency lights indicator, wherein adjusting the speed limit and the specific force limit comprises raising the speed limit and the specific force limit.

In Example 45, a method for vehicle data management according to embodiments of the present invention includes receiving a speed value from a speed sensing device located on the emergency vehicle, receiving an indication of an identity of a current driver of the emergency vehicle, establishing a vehicle data record, determining a safety score for the current driver based at least partially on the vehicle data record, adjusting a speed limit based on the determination, and creating a flag in the vehicle record when the speed value is higher than the speed limit.

In Example 46, the method of Example 45, wherein the speed sensing device is a global positioning system device.

In Example 47, the method of Example 45 or Example 46, wherein the current driver is a first current driver, wherein the safety score is a first safety score, the method further including receiving an indication of an identity of a second current driver of the emergency vehicle, updating the vehicle data record to reflect a driver change from the first current driver to the second current driver, determining a second safety score for the second current driver based at least partially on the vehicle data record, and adjusting the speed limit based on the determination of the second safety score.

In Example 48, a method for vehicle data management according to embodiments of the present invention includes receiving a speed value from a speed sensing device located on the emergency vehicle, receiving a speed limit value corresponding to a current position of the emergency vehicle, establishing a vehicle data record, adjusting a speed limit based on the speed limit value, and creating a flag in the vehicle data record when the speed value is higher than the speed limit.

In Example 49, the method of Example 48, wherein the speed limit value is a legal speed limit for a section of road on which the emergency vehicle is currently traveling.

In Example 50, the method of Example 48 or Example 49, wherein the speed limit is set to equal the speed limit value.

In Example 51, the method of any of Examples 48-50, wherein receiving the speed limit value includes identifying a current vehicle position using the navigation system of the emergency vehicle, and querying a maps database to determine the speed limit value based on the current vehicle position.

In Example 52, a system for vehicle data management according to embodiments of the present invention includes a siren activation indicator, an audio delivery device located in an emergency vehicle, and a vehicle data management device communicably coupled to the siren activation indicator and the audio delivery device, the vehicle data management device configured to deliver audio messages to a person in the emergency vehicle via the audio delivery device based on one or more vehicle safety conditions, wherein the vehicle data management device is further configured to determine whether a siren of the emergency vehicle is activated based on the siren activation indicator, and increase a volume at which the audio messages are delivered via the audio delivery device based on a determination that the siren is activated.

In Example 53, a system for vehicle data management according to embodiments of the present invention includes a speed sensing device located on an emergency vehicle, the speed sensing device configured to indicate a speed of the emergency vehicle, an audio delivery device located in an emergency vehicle, and a vehicle data management device communicably coupled to the speed sensing device and the audio delivery device, the vehicle data management device configured to deliver audio to a person in the emergency vehicle via the audio delivery device based on one or more vehicle safety conditions, wherein the vehicle data management device is further configured to select a volume at which the audio is delivered via the audio delivery device that is at least partially proportional to the speed, such that the volume is higher at a higher speed and lower at a lower speed.

In Example 54, the system of Example 53, wherein the audio is an audio message.

In Example 55, the system of Example 53 or Example 54, wherein the audio is a tone.

In Example 56, a system for vehicle data management according to embodiments of the present invention includes a crew member identification device located on an emergency vehicle, the crew member identification device configured to receive an indication of an identity of a current crew member of the emergency vehicle, a media content delivery device located in the emergency vehicle, and a vehicle data management device communicably coupled to the crew member identification device and the media content delivery device, the vehicle data management device configured to determine whether the current crew member falls within a first classification or a second classification based on the indication, and deliver a first media content to the current crew member via the media content delivery device if the current crew member falls into the first classification and deliver a second media content to the current crew member via the media content delivery device if the current crew member falls into the second classification, wherein the first media content is different from the second media content.

In Example 57, the system of Example 56, wherein the first classification is supervisor, and wherein the second classification is non-supervisor.

In Example 58, the system of Example 56 or Example 57, wherein the crew member is a driver of the emergency vehicle, and wherein the first classification is drivers who have experience driving the emergency vehicle and the second classification is drivers who do not have experience driving the emergency vehicle.

In Example 59, the system of any of Examples 56-58, wherein the crew member is a driver of the emergency vehicle, and wherein the first classification is drivers who are qualified to drive the emergency vehicle and the second classification is drivers who are not qualified to drive the emergency vehicle.

In Example 60, the system of any of Examples 56-59, wherein the crew member is a driver of the emergency vehicle, and wherein the first classification is drivers who are on probationary status and the second classification is drivers who are not on probationary status.

In Example 61, the system of any of Examples 56-60, wherein the vehicle data management device is further configured to log maintain a vehicle record, and to log delivery of the first or second media.

In Example 62, the system of any of Examples 56-61, wherein the vehicle data management device is further configured to confirm receipt of the first or second media by the first crew member or the second crew member, respectively.

In Example 63, a system for vehicle data management according to embodiments of the present invention includes a crew member identification device located on an emergency vehicle, the crew member identification device configured to receive an indication of an identity of a current crew member of the emergency vehicle, a user experience system, wherein activation of the user experience system is configured to improve the current crew member's physical or emotional comfort or driving decision freedom within the emergency vehicle, a vehicle data management device communicably coupled to the crew member identification device and the user experience device, the vehicle data management device configured to query a remote server based on the identity of the current crew member, receive a crew member performance score from a remote server based on the query, and activate the user experience system if the crew member performance score exceeds a predefined level.

In Example 64, the system of Example 63, wherein the predefined level is customizable via the remote server.

In Example 65, the system of Example 63 or Example 64, wherein the predefined level is customizable by a person other than the current crew member.

In Example 66, the system of any of Examples 63-65, wherein the crew member performance score is based on the crew member's past performance with the emergency vehicle.

In Example 67, the system of any of Examples 63-66, wherein the crew member is a driver of the emergency vehicle.

In Example 68, the system of any of Examples 63-67, wherein the crew member is a driver of the emergency vehicle.

In Example 69, the system of any of Examples 63-68, wherein the user experience system includes a sound system.

In Example 70, the system of any of Examples 63-69, wherein the user experience system includes an air conditioning system.

In Example 71, the system of any of Examples 63-70, wherein the user experience system includes a throttle governing device, and wherein activation of the user experience system includes deactivation of the throttle governing device.

In Example 72, a method for dynamic vehicle data report generation according to embodiments of the present invention includes receiving vehicle data record information from a vehicle data management device on an emergency vehicle, storing the vehicle data record information in a database remote from the emergency vehicle, receiving a report generation request, wherein the report generation request identifies a period of time and a set of one or more vehicle data fields, querying the database to identify vehicle record data that satisfies the report generation request, and generating a report for display that includes the set of one or more vehicle data fields over the period of time.

In Example 73, the method of Example 72, wherein the set of one or more vehicle data fields are displayed simultaneously in graphical format plotted verses time, over at least the period of time, in the report.

In Example 74, the method of Example 72 or Example 73, wherein receiving vehicle data record information includes receiving vehicle data record information about an emergency response by the emergency response vehicle during the emergency response.

In Example 75, the method of any of Examples 72-74, wherein receiving the report generation request includes receiving the report generation request with a web server, and wherein generating a report for display includes sending the report to a web browser application that is communicably coupled to the web server.

In Example 76, the method of any of Examples 72-75, wherein the set of one or more vehicle data fields includes at least one vehicle safety field and at least one patient medical field.

In Example 77, the method of any of Examples 72-, wherein generating the report for display includes generating the report for display that includes summaries of the set of one or more vehicle data fields over the period of time.

In Example 78, the method of any of Examples 72-77, wherein the database includes data from emergency lights and siren devices installed in the vehicle, driver identification data, and patient medical data.

In Example 79, the method of any of Examples 72-78, wherein the database further includes vehicle maintenance data and vehicle safety performance data.

In Example 80, a system for vehicle safety according to embodiments of the present invention includes a video capture device located on a vehicle, a panic button located on the vehicle, a vehicle data management device located on the vehicle, the vehicle data management device communicably coupled to the video capture device and the panic button, the vehicle data management device configured to, upon activation of the panic button, automatically stream video footage from the video capture device to a remote web browser.

In Example 81, the system of Example 80, wherein the vehicle data management device is further configured to send an alarm signal to the remote web browser upon activation of the panic button.

In Example 82, the system of Example 80 or Example 81, further comprising an audio capture device located on the vehicle, the vehicle data management device further configured to automatically stream audio footage from the audio capture device to the remote web browser upon activation of the panic button.

In Example 83, a system for vehicle data management according to embodiments of the present invention includes an ambient noise level sensor, an audio delivery device located in an emergency vehicle, and a vehicle data management device communicably coupled to the ambient noise level sensor and the audio delivery device, the vehicle data management device configured to deliver audio messages to a person in the emergency vehicle via the audio delivery device based on one or more vehicle safety conditions, wherein the vehicle data management device is further configured to determine the intensity of ambient noise in the emergency vehicle from the ambient noise level sensor, and increase a volume at which the audio messages are delivered via the audio delivery device when the intensity of ambient noise increases.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 8 illustrates an example "last download" report, according to embodiments of the present invention.

FIG. 9 illustrates a driver trip summary report, according to embodiments of the present invention.

FIG. 10 illustrates an events report, according to embodiments of the present invention.

FIG. 11 illustrates an overspeed report, according to embodiments of the present invention.

FIG. 13 illustrates a driver safety summary report, according to embodiments of the present invention.

Figure 1:
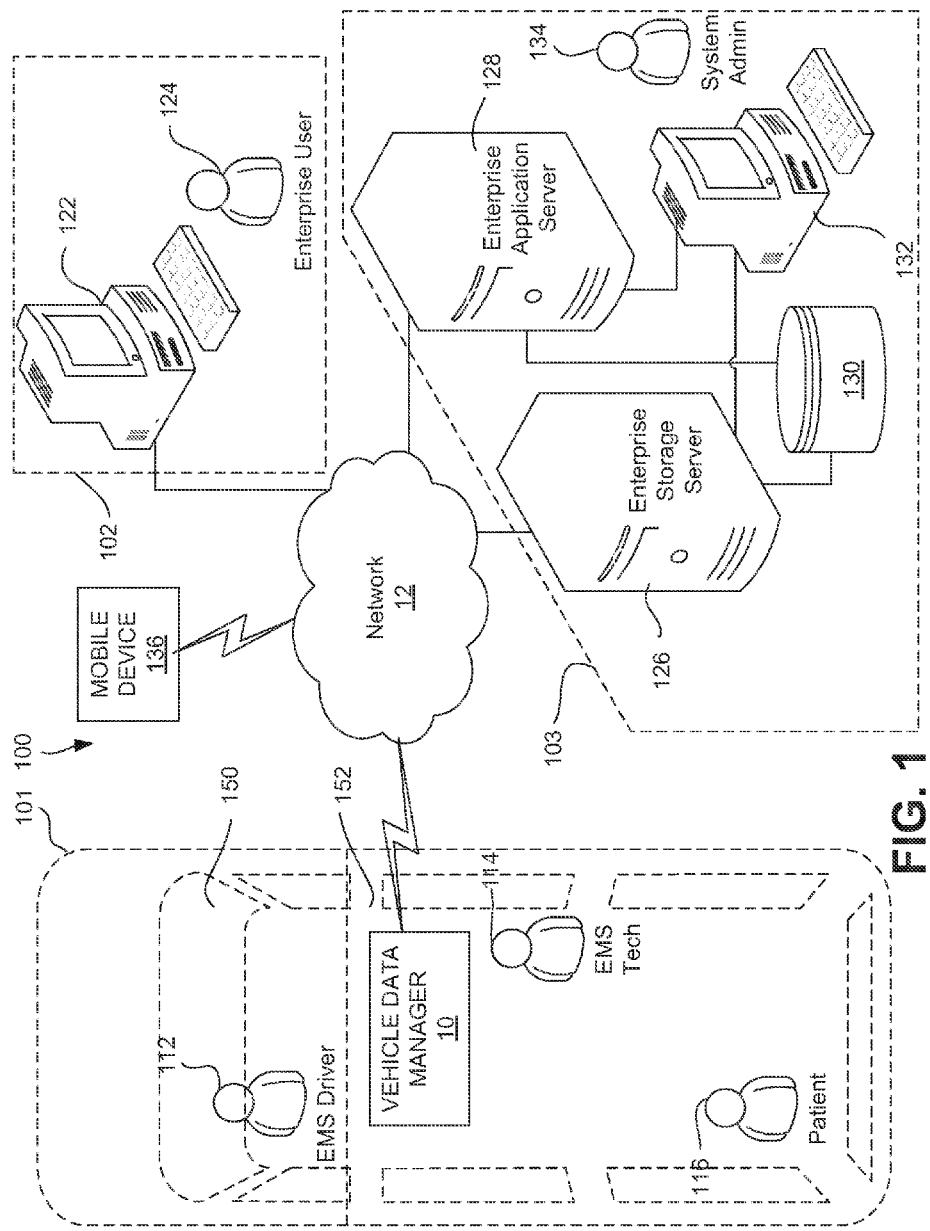
FIG. 1 illustrates an emergency medical services data management and access system, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

As illustrated in FIG. 1, a system 100 according to embodiments of the present invention performs vehicle data management, for example driver performance and safety data management. System 100 includes a mobile environment 101, an enterprise environment 102, and an administration environment 103. Devices within the various environments 101, 102, 103 may be communicably coupled via a network 12, such as, for example, the Internet.

As used herein, the phrase "communicably coupled" is used in its broadest sense to refer to any coupling whereby information may be passed. Thus, for example, communicably coupled includes electrically coupled by, for example, a wire; optically coupled by, for example, an optical cable; and/or wirelessly coupled by, for example, a radio frequency or other transmission media. "Communicably coupled" also includes, for example, indirect coupling, such as through a network or a series of devices and/or communication protocols, or direct coupling. For example, "communicably coupled" may include coupled wirelessly via Wi-Fi and/or BlueTooth®. The network 12 may also take the form of an ad hoc, self-configuring, self-healing network.

According to embodiments of the present invention, the mobile environment 101 is an ambulance or other EMS vehicle—for example a vehicular mobile environment (VME). The mobile environment 101 may be an emergency vehicle such as an ambulance, a fire truck, a police car, a rescue helicopter, a boat, a fixed wing aircraft, or other emergency vehicle. The mobile environment may also be the local network of data entry devices as well as diagnostic and therapeutic devices established at time of treatment of a patient or patients in the field environment—the "At Scene Patient Mobile Environment" (ASPME). The mobile environment 101 may also be a combination of one or more of VMEs and/or ASPMEs. The mobile environment 101 may also be a work vehicle, such as, for example, a delivery vehicle, a public transportation vehicle, a waste management vehicle, or a hauling vehicle.

As illustrated in FIG. 1, an EMS technician 114, for example a paramedic or technician or other treatment professional, may be in the rear cabin 152 of the emergency vehicle 101 taking care of the patient 116, who may be laying in a bed or stretcher (not shown). The EMS driver 112 may be located in the front cabin 150 of the emergency vehicle 101, according to embodiments of the present invention. Although the vehicle data management system 10 is shown in the rear cabin 152, it may be located anywhere in the vehicle 101, and/or the location of its hardware and/or software may be distributed in different places throughout the vehicle 101.

The vehicle data management system ("VDM") 10 is communicably coupled to network 12, which is also communicably coupled with the enterprise environment 102 and the administration environment 103. A mobile device 136, for example a smartphone, may also be communicably coupled to network 12, according to embodiments of the present invention. The VDM 10, and other computers or devices described herein, may be or include a computer system 400 as described below with respect to FIG. 4, according to embodiments of the present invention. Functionality of the VDM 10 may also be performed using one or more circuits or integrated circuits or combination of computers and circuits, according to embodiments of the present invention. Although VDM 10 is described as one device or system, VDM 10 may be multiple devices, and its software and/or hardware which performs its described functions may be located on different devices or in different locations, according to embodiments of the present invention. According to some embodiments of the present invention, the VDM 10 is a box, housing, frame, and/or enclosure which includes a processor and a memory with instructions for carrying out the VDM's 10 functions as described herein, and which is communicably coupled to various devices and/or sensors within the vehicle 101, as well as to the network 12, according to embodiments of the present invention.

According to embodiments of the present invention, the VDM 10 is configured to establish a vehicle record. The vehicle record may be a set of data stored locally in the mobile environment 101 and/or transmitted via the network 12 to other environments for later storage, use, and integration with other vehicle records. The vehicle record may include the status of one or more conditions at particular moments in time or over ranges of time. In addition to creating the vehicle record, the VDM 10 may also alert drivers or other crew members of the vehicle 101 of particular situations, for example safety violations (actual and/or perceived), which may in some cases also be made part of the vehicle record. As such, all or a portion of the vehicle record may be a vehicle driving safety record, according to embodiments of the present invention.

In situations in which all of some of the VDM 10 is a box, the box may have an outer structure that is impact resistant, fire resistant, and/or water resistant and/or watertight, so that in the occurrence of a crash or other catastrophic event, the vehicle record stored on the VDM 10 may later be recovered, similar to a "black box" for an airplane, according to embodiments of the present invention.

Data from the VDM 10 (and therefore data from the devices communicably coupled with the VDM 10) may be received by one or more enterprise storage servers 126 in an administration environment 103 and stored in an enterprise database 130, and the same information may be accessed and provided by one or more enterprise application servers 128 to a workstation 122 of an enterprise user 124, according to embodiments of the present invention. The database 130 may be multiple databases which are linked; for example, vehicle speed data about a particular ambulance run in one database may be linked with patient data for the patient who was transported in another database, for example by a unique ambulance run identification number, according to embodiments of the present invention. According to embodiments of the present invention, the VDM 10 is communicably coupled to the storage server 126 which is communicably coupled to the database 130, and the application server 128 is communicably coupled to the database and to the enterprise workstation 122. Such devices may be communicably coupled via a network 12 such as, for example, the Internet.

When the VDM 10 receives updated information from one or more of the devices to which it is communicably coupled, the VDM 10 sends the updated information to the enterprise storage server 126, which stores the updated information in a database which may be contained on a storage medium 130, according to embodiments of the present invention. Hence, information collected by the vehicle data manager may be stored in a mobile memory 406, 408 (see FIG. 4), remote enterprise database 130, or both, according to embodiments of the present invention. An enterprise user 124, who may be an emergency room nurse monitoring and/or preparing for ambulance arrivals, an emergency room physician, and/or a medical director at home, for example, may access information similar to information collected by VDM 10 by requesting the information via an enterprise workstation 122. The enterprise user may also be a dispatcher or supervisor or other personnel who monitors vehicle activities, for example police or fire response personnel. For example, the enterprise workstation 122 accesses a web interface and/or thin client web browser application which requests the information over the network 12 from application server 128. Application server 128 queries the database 130 for the information, and returns a display to enterprise workstation, according to embodiments of the present invention. The application server 128 may be configured to stream data from the VDM 10, and/or to store data from the VDM 10, according to embodiments of the present invention.

According to embodiments of the present invention, the website display in the enterprise environment 102 is accessed via a generic internet browser by a supervisor or dispatcher for one or more ambulances 101 or other emergency vehicles. The website may be secured by logon username and password, for example. Each ambulance may be identified by a vehicle name; the supervisor chooses from a list of incoming vehicles, after which the data for that patient is displayed. The data may be shown just as it appears on the mobile screen, also in "clinical time." The vehicle data manager 10 collects information about driver behavior and/or performance, and sends the information, for example alerts about overforce or overspeed conditions, to the enterprise user 124. Alerts about driver performance issues or safety concerns may also be sent to a user via a mobile device 136, according to embodiments of the present invention.

According to yet other embodiments of the present invention, the enterprise user 124 is a vehicle fleet management operator, who accesses data about the driving performance and vehicle maintenance or "wear and tear" information via the enterprise workstation 122, in order to determine when maintenance should be scheduled, and/or the type of maintenance that may be recommended or necessary.

Figure 7:
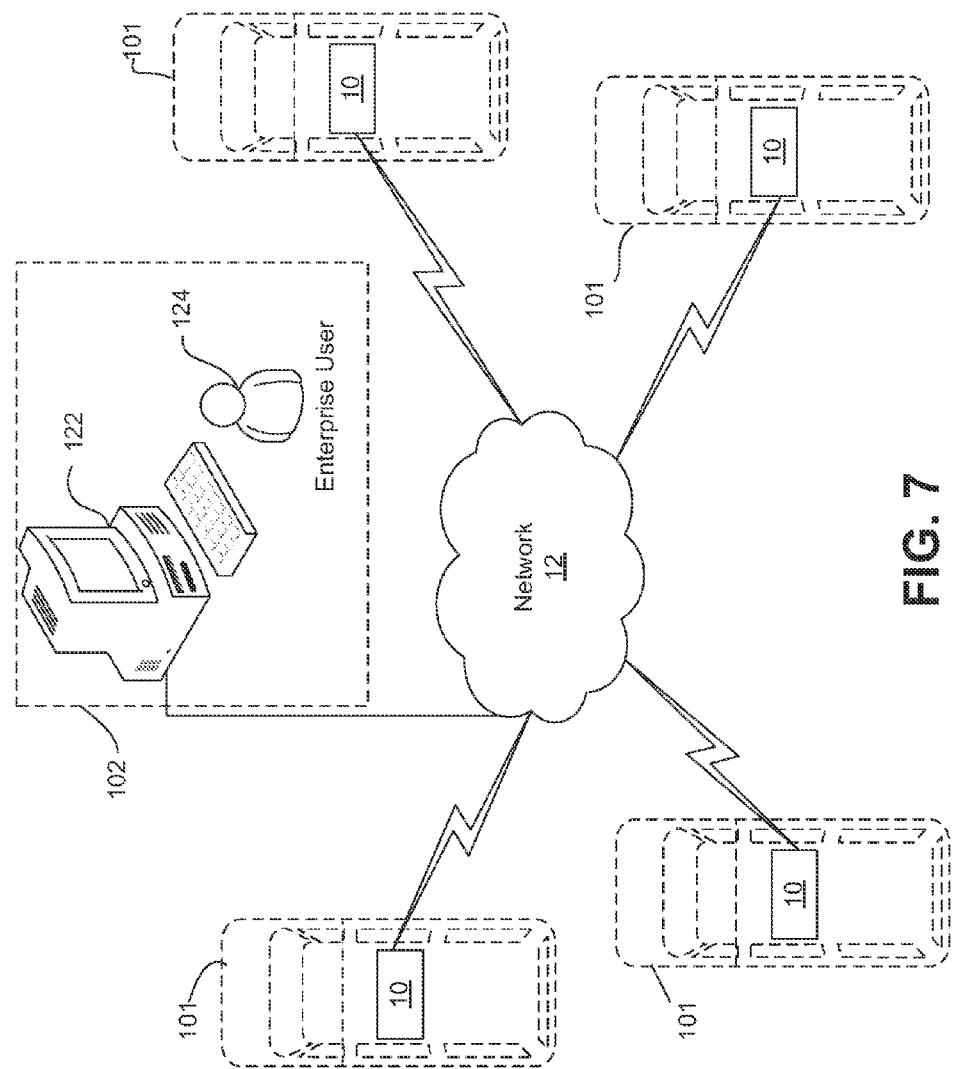
FIG. 7 illustrates multiple vehicles 101 communicably coupled to a network and an enterprise workstations, according to embodiments of the present invention.

Although FIG. 1 depicts a single VDM 10 in the mobile environment 101, more than one VDM 10 may be used in the mobile environment 101 to communicably connect to the same or a different set of devices and/or driver performance monitoring systems. And although FIG. 1 depicts one mobile environment 101, more than one mobile environment 101 and/or more than one VDM 10 may be communicably coupled with the administration environment 103 and/or the enterprise storage server 126, according to embodiments of the present invention, as illustrated in FIG. 7. According to embodiments of the present invention, the enterprise storage server 126 receives vehicle data information from VDM 10 and stores it in database 130 along with an authenticated time stamp and an identifier associating the information with a particular EMS crew member and/or a particular EMS vehicle. In this way, data from multiple vehicles and/or multiple crew members and drivers may be accessed by the enterprise user 124.

As also illustrated in FIG. 1, the enterprise storage server 130 may securely store the information received from one or more VDMs 10 for longer periods of time to permit later use of the information. For example, the VDM 10 may receive crew-identifying information such as name, address, employee number, and/or drivers license number via a crew member ID device 14, and then may convey some or all of the crew-identifying information to enterprise storage server 126 with a request for the enterprise storage server 126 to query the database 130 for past records involving the same crew member or vehicle. The enterprise storage server 126 may then forward any such records or portions of such records back to the VDM 10 to permit the VDM 10 to make any configurations and/or settings to the VDM 10. Similarly, such past vehicle record information may also be accessed by the enterprise user 124, according to embodiments of the present invention. A system administrator 134 may access and/or monitor the data in database 130 and/or modify the instructions of the servers 126, 128 via administration workstation 132, which may be communicably coupled to the servers 126, 128, according to embodiments of the present invention. The VDM 10 and server 126 may be configured to exchange data based on priority, cost, and/or size, according to embodiments of the present invention. For example, important data may be communicated in its entirety, while costlier or larger or less important data may be de-prioritized, or not communicated at all, between the VDM 10 and server 126, according to embodiments of the present invention.

According to some embodiments of the present invention, the VDM 10 transmits all vehicle record information to another device or devices via the network 12. According to other embodiments of the present invention, the VDM 10 records all vehicle record information, either permanently or in a first-in-first-out memory, and transmits vehicle record information to another device or devices via the network 12 only for vehicle record information corresponding to a flagged event or time or time period. According to yet other embodiments of the present invention, the VDM 10 only records and/or transmits vehicle information corresponding to a flagged event or time or time period.

Figure 2:
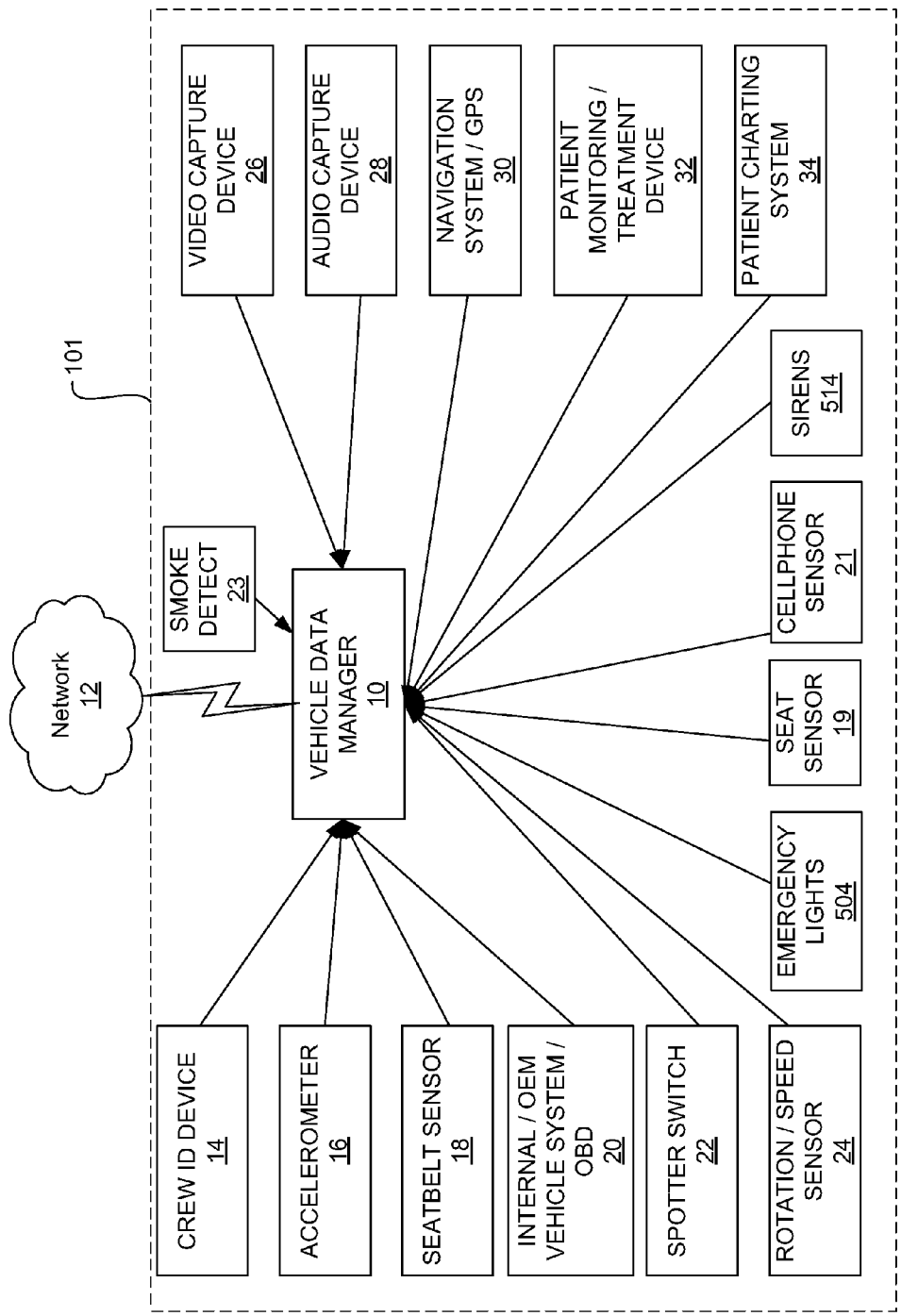
FIG. 2 illustrates devices in a mobile environment communicably coupled with a vehicle data management device so as to send information to the vehicle data management device, according to embodiments of the present invention.

FIG. 2 illustrates examples of some devices which may be communicably coupled to the VDM 10, according to embodiments of the present invention. Although FIG. 2 primarily illustrates devices from which VDM 10 may receive signals and/or other information about the vehicle, such coupling may permit two-way or bi-directional communication, or communication in a direction opposite to that shown in FIG. 2, according to embodiments of the present invention. And although various devices are described, such devices may be independent devices or may be coupled with other devices or share functionality with other devices, both those kinds of devices discussed herein, and those not discussed herein, according to embodiments of the present invention.

A crew identification (ID) device 14 may be communicably coupled to the VDM 10. The crew ID device 14 may be configured to receive an indication of an identity of a current crew member of the emergency vehicle 101, and pass the indication and/or identity on to the VDM 10, according to embodiments of the present invention. The crew ID device 14 may be, for example, an electronic card reader, an RFID reader, a keypad, a bar code scanner, or a biometric identification system such as a voice recognition system, a retinal scanner, a fingerprint identification system, a facial recognition system, and/or the like. Each employee may carry a unique identification card or badge or other physical media which provides an identity indication to the crew ID device 14, according to embodiments of the present invention. The crew ID device 14 may also include two or more different crew identification systems, for example a fingerprint authenticator in combination with an electronic card reader, according to embodiments of the present invention.

An accelerometer 16 may also be communicably coupled to the VDM 10. The accelerometer 16 may be configured to measure proper acceleration, which may also be referred to as a specific force, or g-force. The accelerometer 16 may be configured to provide a signal that can be used to calculate the current specific force, and/or provide an indication of a value of the specific force, to the VDM 10. According to some embodiments of the present invention, the accelerometer 16 may be a dual-axis accelerometer, which indicates a specific force in each of two perpendicular directions. These two perpendicular directions may be aligned to be parallel or substantially parallel to the plane of the ground surface over which the vehicle 101 travels, for example the plane formed by the lowermost point on each of the four tires. According to some embodiments of the present invention, one primary direction of alignment of the accelerometer 16 is parallel with the direction of travel of the vehicle 101, while the other primary direction of alignment of the accelerometer 16 is perpendicular with the direction of travel of the vehicle 101. The accelerometer 16 may also be a three-axis accelerometer. A combination of two independent accelerometers in a way that operates as a dual-axis accelerometer may also be referred to as a dual-axis accelerometer, and a combination of three independent accelerometers in a way that operates as a three-axis accelerometer may also be referred to as a three-axis accelerometer, according to embodiments of the present invention.

A seatbelt sensor 18 may also be communicably coupled to VDM 10. The seatbelt sensor 18 may be configured to provide a signal or an indication to VDM 10 about whether a particular seatbelt is engaged for a particular seat in the vehicle 101. The data from a seatbelt sensor 18 may be used in combination with the data from a seat sensor 19 to determine whether a user is seated in a particular seat. The seatbelt sensor 18 may include a switch in the particular buckle, according to embodiments of the present invention. The seat sensor 19 may include a seat proximity sensor to determine whether a user is on or near enough to the seat proximity sensor to indicate that the user is sitting in the seat, and/or a pressure sensor to determine whether enough pressure is exerted on the seat to indicate a user's presence in the seat, according to embodiments of the present invention. Both seatbelt sensor 18 and seat sensor 19 may also include signals from a vehicle's 101 on-board diagnostics or OBDII ("OBD") system 20, similar to the OBDII signal that also instructs a driver's instrument panel to chime when the vehicle reaches a particular speed without a particular seatbelt having been secured.

A cellphone sensor 21 may also be communicably coupled to VDM 10. The cellphone sensor may also be a BlueTooth® or other wireless communications protocol sensor, according to embodiments of the present invention. The cellphone sensor 21 may be configured to provide a signal to VDM 10 when a cellphone, for example a personal cellphone of driver 112, is sensed in the front cabin 150, and/or is sensed in transmitting mode in the front cabin 150, according to embodiments of the present invention. The VDM 10 may record in the vehicle data record a safety exception if such personal cellphone use is detected, and/or if such personal cellphone use is detected during a response procedure, during vehicle emergency operation, and/or when vehicle ignition is activated, according to embodiments of the present invention. A breath alcohol detector may also be communicably coupled to VDM 10, in order to confirm that the driver 112 is not impaired, according to embodiments of the present invention. According to some embodiments of the present invention, the VDM 10 may detect the presence of multiple wireless communications signals, and be able to determine which signals are being legitimately used by VDM 10 or other vehicle devices, and which are signals which correlate with personal mobile device use. These determinations may be made by VDM 10 based on process of elimination, according to embodiments of the present invention.

A spotter switch 22, which may also be communicably coupled to the VDM 10, may be a simple switch, for example a spring-loaded button, that may be pushed when the vehicle is backing up or in reverse, in order to indicate that a spotter is being used. Because a vehicle driver is typically unable to reach the steering wheel and gas pedals at the same time as the spotter switch 22, the spotter switch 22 may be used to indicate the physical presence of a spotter, also known as a ground guide, behind the vehicle 101 during backing procedures, according to embodiments of the present invention.

A smoke detector 23 may also be communicably coupled to the VDM 10. The smoke detector 23 may be configured to provide a signal to VDM 10 when smoke is detected, for example in the front cabin 150 and/or rear cabin 152. The VDM 10 may be configured to sound an audible alarm, provide a visual alarm, and/or record a safety exception in the vehicle data record based on the detection of smoke and/or carbon monoxide, according to embodiments of the present invention.

A rotation and/or speed sensor 24 may also be communicably coupled to the VDM 10. The speed sensor 24 may include a sensor and circuit that creates a wave with a frequency corresponding to the frequency of rotation of a wheel or axle, and circuitry or other mechanisms for counting the frequency and/or for directly counting the number of rotations of the wheel or axle. This information may be translated into vehicle speed information, either by the speed sensor 24 and/or by the VDM 10, for example by multiplying the number of rotations per second by the distance corresponding to each rotation in order to arrive at a vehicle distance traveled per second, according to embodiments of the present invention. A navigation system and/or GPS device 30 may also operate as a speed sensor, by providing a signal corresponding to, or calculating a value corresponding to, the change in distance of the GPS per change in time, according to embodiments of the present invention.

A video capture device 26 may also be communicably coupled to the VDM 10, according to embodiments of the present invention. The video capture device 26 may be any imaging device capable of capturing visual information within its field of view, for example, a camera or a camcorder, and transmitting some or all of such visual information to the VDM 10, according to embodiments of the present invention. For example, the video capture device 26 may be configured to capture at least four frames per second, or at least eight frames per second, or at least twenty frames per second, or at least one hundred frames per second, whether or not each of such frames are stored in memory and/or transmitted to the VDM 10, according to embodiments of the present invention. Video capture devices 26 may be internal and/or external to the vehicle 101, and can capture both events happening inside or outside the vehicle, as well as weather conditions, pedestrians, other vehicles, traffic signals, and the like.

An audio capture device 28 may also be communicably coupled to the VDM 10, according to embodiments of the present invention. The audio capture device 26 may be any audio device capable of capturing sound information, for example a digital sound recorder or a voice recorder, and transmitting some or all of such audio data to the VDM 10, according to embodiments of the present invention. The video capture device 26 and audio capture device 28 may be one device, for example in the form of a camcorder; alternatively, one audiovisual device with both audio and video capabilities may serve as an audio capture device 28 only, a video capture device 26 only, or both, according to embodiments of the present invention. The audio capture device 28 may also be configured to detect audio levels and/or ambient noise, for example the level of ambient noise in decibels, according to embodiments of the present invention.

The mobile environment 101 may also include a navigation system 30 communicably coupled to the VDM 10. Navigation system 30 may be used by the driver 112 to track the mobile environment's 101 position, locate the mobile environment 101 and/or the emergency location, and locate the transport destination, according to embodiments of the present invention. The navigation system 30 may include a Global Positioning System ("GPS"), for example. The navigation system 30 may also be configured to perform calculations about vehicle speed, the travel time between locations, and estimated times of arrival. According to embodiments of the present invention, the navigation system 30 is located at the front of the ambulance to assist the driver 112 in navigating the vehicle. The navigation system 30 may be, for example, a ZOLL® RescueNet® Navigator onboard electronic data communication system. The VDM 10 may also use such navigation systems to obtain posted road speeds, in order to make overspeed determinations, according to embodiments of the present invention.

A patient monitoring and/or treatment device 32 may also be communicably coupled with the VDM 10, according to embodiments of the present invention. The device 32 may be, for example, a defibrillator and/or monitor hooked up to and actively monitoring a patient, and configured to provide information about a patient's condition to the VDM 10 for storage and/or transmission along with other relevant non-patient data. For example, the device 32 may be configured to provide heart rate data, ECG waveform data, respiration data, blood pressure data, and the like, to the VDM 10.

A patient charting system 34 may also be communicably coupled to the VDM 10, according to embodiments of the present invention. The patient charting system 34 may be configured to provide information about a patient's identity or treatment to the VDM 10, according to embodiments of the present invention. According to other embodiments of the present invention, the VDM 10 is communicably coupled to a back-of-ambulance system (not shown) which is, in turn, communicably coupled to various clinical and non-clinical devices like the patient monitoring device 32, the patient charting device 34, and the navigation system 30, such as the back-of-ambulance system described in U.S. Patent Application Ser. No. 61/434,808, filed on Jan. 20, 2011, which is incorporated herein by reference in its entirety for all purposes. Such a back-of-ambulance system may be configured to provide patient information and/or navigation information in order to supplement the vehicle data record and/or provide context for various data items in the vehicle data record, according to embodiments of the present invention.

A vehicle's emergency lights 504 (such as external flashing lights) and sirens 514 systems may also be communicably coupled to VDM 10, according to embodiments of the present invention. This permits the VDM 10 to know when emergency lights 504 and sirens 514 are being used, in order to note such data in the vehicle data record and/or use such data for determining whether certain conditions have been satisfied.

Figure 5:
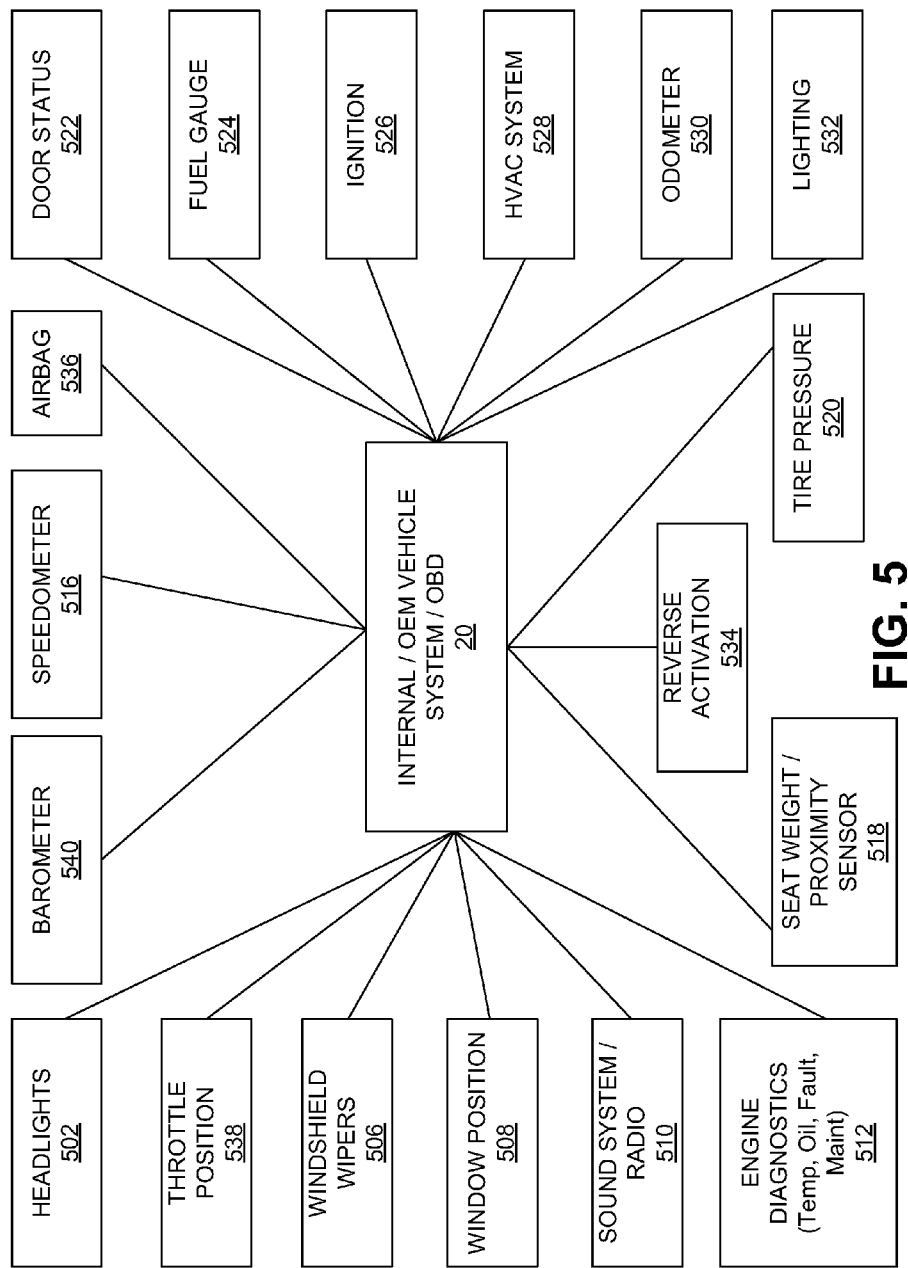
FIG. 5 illustrates internal vehicle and on board diagnostics devices and signalers, according to embodiments of the present invention.

The vehicle's internal electro-mechanical system or systems, which may include the original equipment manufacturer's (OEM) system as installed in the vehicle, the electrical signal indication component of which may be referred to as the OBD system 20, may also be communicably coupled to the VDM 10 and configured to transmit signals to the VDM 10 for the vehicle data record, according to embodiments of the present invention. As such, the installation of duplicate devices or sensors may be avoided by permitting the VDM 10 to "tap into" signals of the OBD system 20. Such OBD system 20 signals may be standard to all vehicles, and/or may be specific to a particular vehicle manufacturer. Some third party systems incorporated into vehicle 101 may include multiplexer systems which combine data from various sources; VDM 10 may be communicably coupled to such multiplexer system or systems, according to embodiments of the present invention. FIG. 5, described below, includes additional information about selected devices, sensors, and/or signals from the OBD system 20 that may be monitored by VDM 10, according to embodiments of the present invention.

Figure 3:
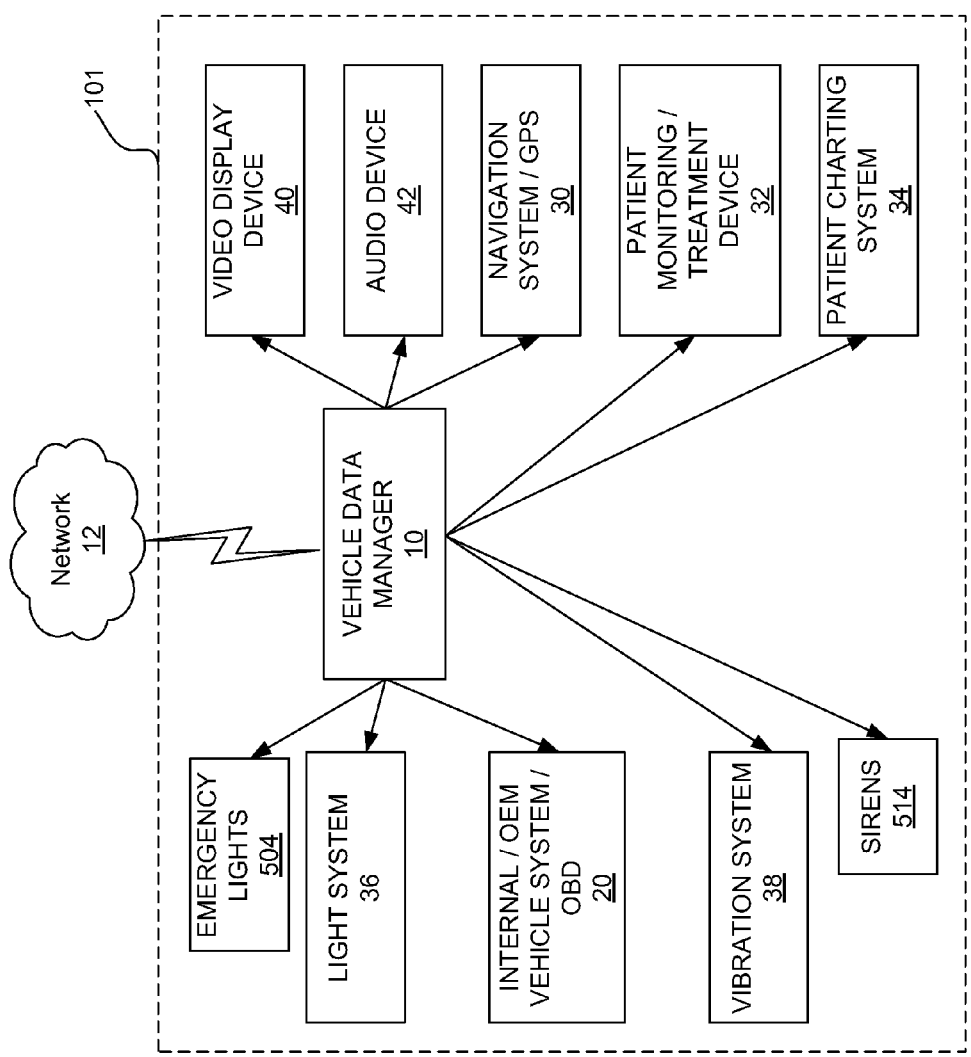
FIG. 3 illustrates devices in a mobile environment communicably coupled with a vehicle data management device so as to receive commands from the vehicle data management device, according to embodiments of the present invention.

FIG. 3 illustrates various devices and/or indicators that may be controlled, either totally or partially, by VDM 10, according to embodiments of the present invention. The VDM 10 may be communicably coupled to light system 36 in order to provide visual feedback to a crew member, for example a driver 112. The light system 36 may be, for example, a light bulb, an instrument lighting panel, a flash bulb or strobe light, an LED, or other light-producing device. The programming instructions of the VDM 10 may also control a light bulb or LED to turn on and off according to a particular pattern, even if the light bulb or LED is normally intended for long-term on and off use. For example, the VDM 10 may turn on an exterior camera display depending upon turn signal activation. If the driver is turning right, then the video display device 40 may be configured to display a feed from a right-side exterior camera (e.g. the camera in position 5 of FIG. 6) to permit the driver to determine if there are any vehicles or other obstructions in the right turn trajectory. The VDM 10 may also be configured to provide audio feedback to one or more users, for example the driver or crew members. As another example, the emergency lights 504 and/or sirens 514 may be remotely controlled from dispatch, for example from the enterprise user 124, according to embodiments of the present invention.

The VDM 10 may also provide signals or control commands to the internal vehicle system 20, in order to control OEM hardware. For example, instead of controlling an independent light system 36, the VDM 10 may control a vehicle lighting system 532 (see FIG. 5), for example the interior lighting system 532 which illuminates the vehicle 101 cabin when a door is opened, according to embodiments of the present invention. The VDM 10 may also be configured to receive a remote command to cycle on and/or off the personal computing hardware of the VDM 10 and/or other devices communicably coupled to the VDM 10, according to embodiments of the present invention. VDM 10 may also permit idle control: when the VDM 10 determines that the vehicle is idling and that the driver has activated the anti-theft system, the VDM 10 may also look at cabin temperature and battery level, and based on such observations, it may turn off the engine of the vehicle, according to embodiments of the present invention. In this way, automatic vehicle idle control may be achieved.

A vibration system 38 may also be communicably coupled to the VDM 10, and may be configured to accept commands for providing tactile feedback to a crew member or occupant of the vehicle 101. For example, the VDM 10 may be configured to activate vibration of the vibration system 38 located within a driver's 112 seat when the vehicle enters an overspeed condition, according to embodiments of the present invention. A vibration system may be included in a seat bottom, seat back, and/or steering wheel, according to embodiments of the present invention.

A video display device 40 may be used by the VDM 10 to display information to a crew member, according to embodiments of the present invention. The video display device 40 may be part of another device, for example the navigation system or a back-of-ambulance system, or may be a standalone video display device. The video display device 40 is configured to display still or moving pictures, text, colors, and other visual cues and signals. For example, the VDM 10 may be configured to make the video display device 40 flash a red display when the vehicle enters an overspeed condition. The video display device 40 may be, for example, a monitor, a screen, an LCD screen, a touch screen, a projection device, a plasma screen, and the like. According to some embodiments of the present invention, when a vehicle user activates a panic button, the VDM 10 notifies the server 128 and the server 128 causes a live video feed to be displayed on the enterprise user's 124 web browser.

An audio device 42 may be used by the VDM 10 to convey audible information to a crew member, according to embodiments of the present invention. The audio device 42 may be part of another device, for example the navigation system or a back-of-ambulance system, or may be a standalone device. The audio device 42 is configured to convey, for example by creating sound waves, audio information, such as voice messages, beeps, voice notifications, alerts, alarms, and other audio cues and signals. For example, the VDM 10 may be configured to cause the audio device 42 to beep when the vehicle enters an overspeed condition. The audio device 42 may be, for example, a speaker, a headphone, a headset, a bell, a siren, a radio, an intercom, a telephone, and the like. The VDM 10 may also use audio device 42 to deliver voice messages such as, for example, a "message of the day" from management. Such messages may encompass other safety aspects, and may also require confirmation (for example, for messages delivered in order to comply with particular regulations, standards, and/or protocol, to enter into the vehicle data record the fact that message delivery was acknowledged).

The navigation system 30, patient monitoring device 32, and/or patient charting system 34 may also be configured to receive signals and/or commands provided by the VDM 10, according to embodiments of the present invention. For example, the VDM 10 may be configured to cause the patient charting system to provide a visual indication to the crew member when a vehicle overforce condition is reached, warning the crew member to wait before inserting an intravenous device due to the possibility for jolting of the rear cabin 152, according to embodiments of the present invention.

Although FIGS. 2 and 3 depict one of each described device, the system 100 and/or each vehicle 101 may include multiple numbers of the described devices. For example, a seatbelt sensor 18 or seat sensor 19 may be included for each separate seat in the vehicle, to permit the VDM 10 to specifically determine the seating and seatbelt status for each seating position.

Some embodiments of the present invention include various steps, some of which may be performed by hardware components or may be embodied in machine-executable instructions. These machine-executable instructions may be used to cause a general-purpose or a special-purpose processor programmed with the instructions to perform the steps. Alternatively, the steps may be performed by a combination of hardware, software, and/or firmware. In addition, some embodiments of the present invention may be performed or implemented, at least in part (e.g., one or more modules), on one or more computer systems, mainframes (e.g., IBM mainframes such as the IBM zSeries, Unisys ClearPath Mainframes, HP Integrity NonStop servers, NEC Express series, and others), or client-server type systems. In addition, specific hardware aspects of embodiments of the present invention may incorporate one or more of these systems, or portions thereof.

Figure 4:
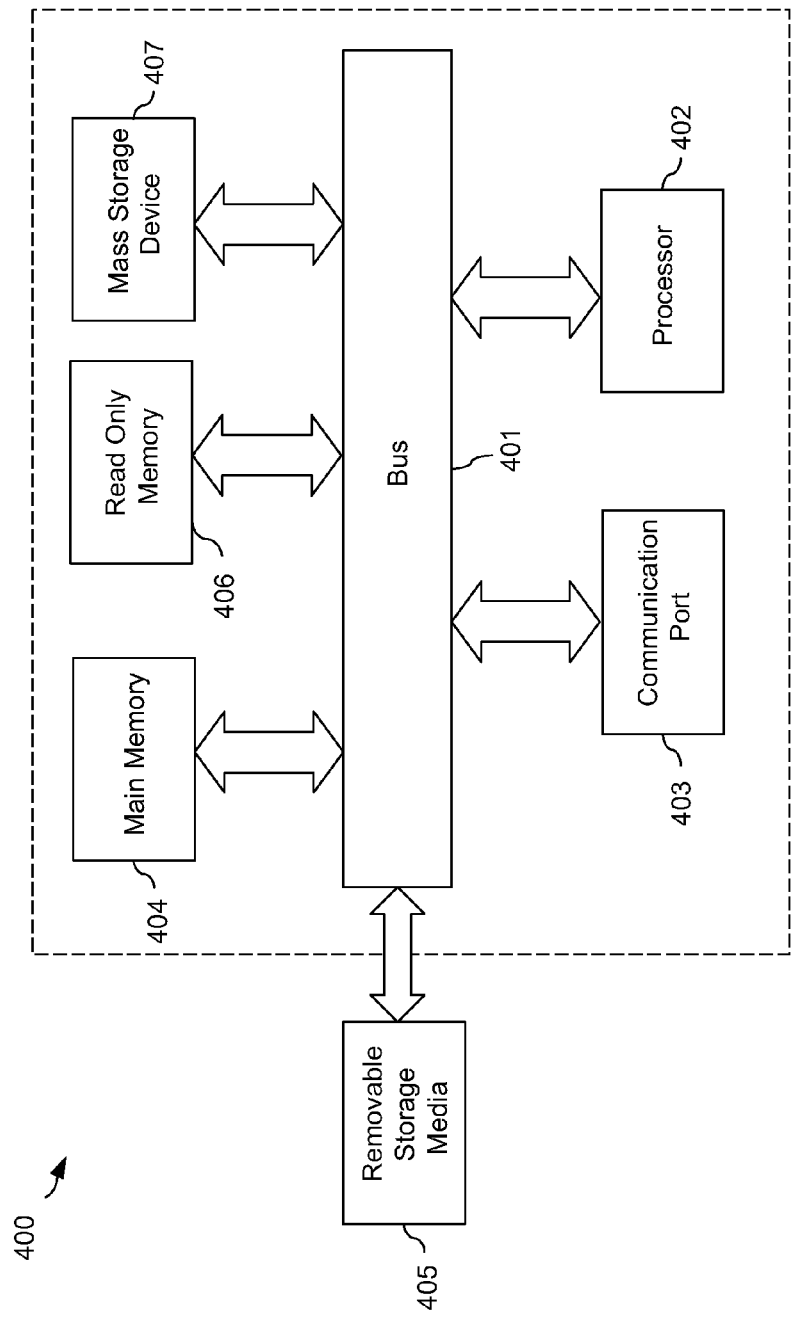
FIG. 4 illustrates a computing device or computer system, according to embodiments of the present invention.

As such, FIG. 4 is an example of a computer system 400 with which embodiments of the present invention may be utilized. According to the present example, the computer system includes a bus 401, at least one processor 402, at least one communication port 4003, a main memory 404, a removable storage media 405, a read only memory 406, and a mass storage 407.

Processor(s) 402 can be any known processor, such as, but not limited to, an Intel® Itanium® or Itanium 2® processor(s), or AMD® Opteron® or Athlon MP® processor(s), or Motorola® lines of processors. Communication port(s) 403 can be any of an RS-232 port for use with a modem based dialup connection, a 10/100 Ethernet port, a Bluetooth® or WiFi interface, or a Gigabit port using copper or fiber, for example. Communication port(s) 403 may be chosen depending on a network such a Local Area Network (LAN), Wide Area Network (WAN), or any network to which the computer system 400 connects. Main memory 404 can be Random Access Memory (RAM), or any other dynamic storage device(s) commonly known to one of ordinary skill in the art. Read only memory 406 can be any static storage device(s) such as Programmable Read Only Memory (PROM) chips for storing static information such as instructions for processor 402, for example.

Mass storage 407 can be used to store information and instructions. For example, hard disks such as the Adaptec® family of SCSI drives, an optical disc, an array of disks such as RAID (e.g. the Adaptec family of RAID drives), or any other mass storage devices may be used, for example. Bus 401 communicably couples processor(s) 402 with the other memory, storage and communication blocks. Bus 401 can be a PCI/PCI-X or SCSI based system bus depending on the storage devices used, for example. Removable storage media 405 can be any kind of external hard-drives, floppy drives, flash drives, zip drives, compact disc-read only memory (CD-ROM), compact disc-re-writable (CD-RW), or digital video disk-read only memory (DVD-ROM), for example. The components described above are meant to exemplify some types of possibilities. In no way should the aforementioned examples limit the scope of the invention, as they are only exemplary embodiments of computer system 400 and related components.

FIG. 5 illustrates examples various devices and/or signals which may be communicably coupled with the VDM 10 and/or which the VDM 10 may be configured to receive or provide, based on a communicable coupling with the vehicle's on board diagnostic and internal systems 20, according to embodiments of the present invention. For example, a vehicle 101 may have headlights 502, windshield wipers 506, a window position sensor 508 or indicator, a sound system and/or radio 510, engine diagnostics codes 512, for example codes indicating a temperature, oil pressure, maintenance, and/or engine fault condition. The vehicle 101 may further include a speedometer 516, which may be configured to provide a signal about the vehicle's speed, a seat weight and/or proximity sensor 518, a tire pressure indicator 520, a door status indicator 522 (for example, a code or device indicating whether a particular door is ajar), a fuel gauge 524, an ignition indicator 526, an heating, ventilation, and/or air conditioning (HVAC) system 528, an odometer 530 configured to indicate a vehicle's mileage, or distance traveled, as of a particular time, a lighting system 532, and a reverse activation indicator 534, which may be a code or device that indicates when the vehicle has been placed into reverse gear, according to embodiments of the present invention. The VDM 10 may also be communicably coupled with an airbag sensor 536, in order to enter into the vehicle data record information about airbag deployment, according to embodiments of the present invention. The VDM 10 may also be communicably coupled to a throttle position sensor 538, in order to enter into the vehicle data record information about whether the driver intended to accelerate or idle, for example. The VDM 10 may also be communicably coupled to a barometer or barometric pressure sensor 540, for example a device or signal that measures or represents a barometric manifold absolute pressure, or simple barometric pressure, according to embodiments of the present invention.

Figure 6:
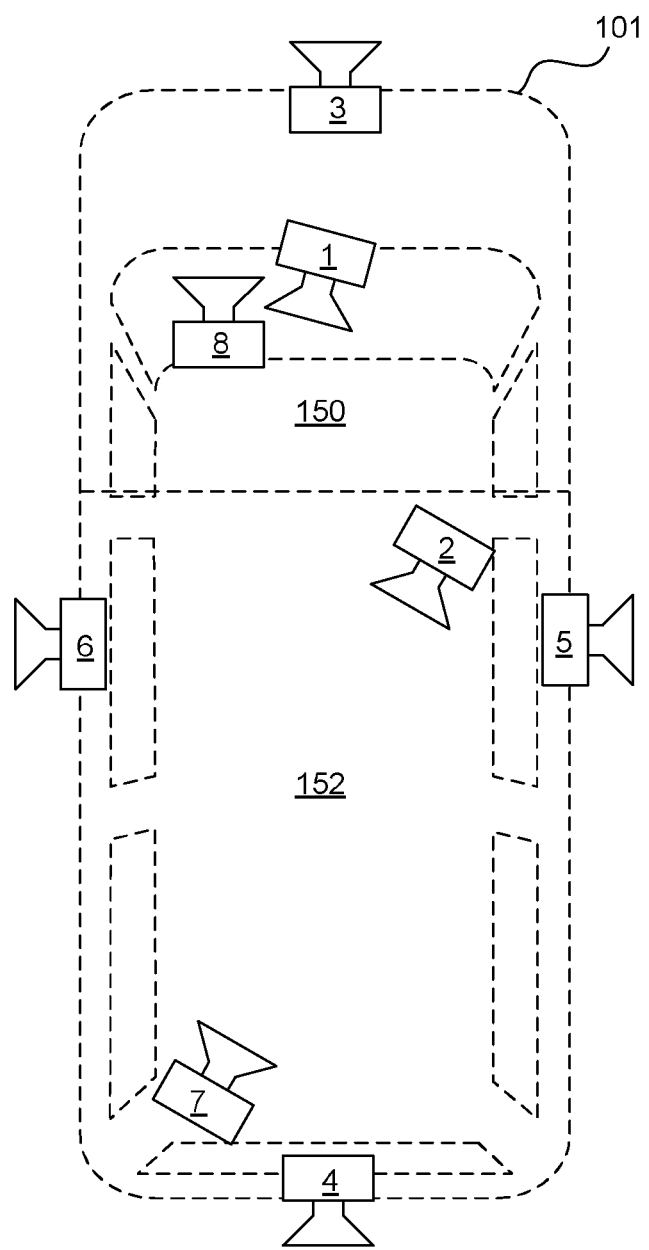
FIG. 6 illustrates a top view of an emergency vehicle, showing different camera positions, according to embodiments of the present invention.

FIG. 6 illustrates various placement positions for one or more video capture devices 26, according to embodiments of the present invention. Camera position 1 is in the front cabin 150 facing toward the driver, with the driver and optionally the driver's surroundings within the field of view. Camera position 2 is in the rear cabin 152, facing toward the interior of the cabin 152. Camera position 7 is also in the rear cabin 152, facing toward the interior of the cabin 152. Other camera positions are possible within the rear cabin 152. Camera positions 2 and 7 are configured to capture within the video capture devices 26 fields of view the patient treatment area, and may be configured to receive visual information (e.g. video frames) about the activities or status of the patient 116 and/or EMS technician 114, according to embodiments of the present invention. Camera position 3 is at or near the front of the vehicle, pointing generally in a direction of normal travel of the vehicle. Camera position 3 permits the video capture device 26 to collect visual information about the front view of the vehicle, similar to what the driver 112 might see by looking out the windshield, according to embodiments of the present invention. Camera position 4 is at or near the rear of the vehicle 101, pointing generally in a direction opposite to normal travel of the vehicle, and permits video capture device 26 to collect visual information about what is happening behind the vehicle, similar, for example, to what the driver 112 might see in the rear-view mirror. Camera position 5 is at or near the right side of the vehicle 101, pointing away from the vehicle, and camera position 6 is at or near the left side of the vehicle 101, pointing away from the vehicle. Camera positions 5 and 6 permit capture of visual information about what is happening outside the vehicle 101 on the sides of the vehicle, according to embodiments of the present invention. Camera position 8 is inside the front cabin 150, facing out in the same direction as the driver's eyes; this camera position 8 may be referred to as the driver's eye view. Numerous other camera positions are possible for gathering various types of visual information, both inside and outside the ambulance. For example, a single camera may be mounted on the top of the vehicle 101 (not shown), and configured to rotate to various positions to capture the same information as camera positions 3, 4, 5, and/or 6. As another example, a panoramic still camera or video camera and/or camera with a spherical mirror may be mounted on the top of the vehicle 101 and configured to take photographs and/or video in three-hundred sixty degree view, for later conversion to a panoramic and/or continuous image or video, according to embodiments of the present invention.

FIG. 7 illustrates various emergency vehicles 101 each with a VDM 10 communicably coupled (e.g. wirelessly) to network 12, and illustrates how an enterprise user 124 may receive vehicle data from multiple different vehicles 101, according to embodiments of the present invention. For example, a supervisor 124 for a group ambulances 101 may toggle or cycle through the live or near-live video feeds from camera position 1 for each ambulance 101 to see what each driver 112 is doing, according to embodiments of the present invention.

A VDM 10 according to embodiments of the present invention creates a vehicle record, for example a vehicle driving safety record, based on various types of information which may include, without limitation, driver identification information, seatbelt information, vehicle backing information, force information, and speed information, according to embodiments of the present invention.

The VDM 10 may be configurable to generate individual tone activations (e.g. on/off tone activations delivered through the audio device 42) which are user configurable. The VDM 10 may deliver various types of tones, for example a growl (e.g. clicking, or "Geiger counter" type sound), intermittent tone, steady violation tone, and voice messages. The intermittent and steady tones may vary in pitch. These tones may be applied to all users, but the volume level may be customized by each user according to various versions of VDM 10. In some cases, the VDM 10 may use growling tones and intermittent tones as warnings and reminders, while using steady tones to indicate violations. Voice messages may be utilized to describe a particular warning or violation, and/or to delivery user-defined messages to the crew.

According to some versions of VDM 10, the tone settings are configurable for individual vehicles, groups of vehicles, and/or the entire fleet. For example, while a driver 112 of a particular vehicle 101 may be able to customize the tone settings for that particular vehicle 101, an enterprise user 124 may be able to configure the tone settings for each vehicle 101, groups of vehicles, and/or the entire fleet controlled via enterprise workstation 122. According to some embodiments of the present invention, the driver 112 and/or crew member 114 may turn off an indicator light which is normally configured to convey warning alerts from the VDM 10.

According to some embodiments of the present invention, the user may activate with the VDM 10 an automatic audible feedback volume control based on vehicle speed, siren activation, and/or ambient noise level. For example, the user may configure the VDM 10 to increase the volume of a message delivered via the audio device 42 based on the VDM 10 sensing a siren activation signal from the siren module 514, or based on the VDM 10 sensing a vehicle speed (e.g. from either the speedometer module 516 and/or the vehicle speed sensor 24) that is beyond a certain threshold. According to other embodiments of the present invention, the VDM 10 adjusts the volume of such audio messages proportionally according to the current speed value.

The VDM 10 may also include a driver identification routine or routines, according to embodiments of the present invention. The VDM 10 in some versions may permit driver logon at any time, and may confirm it with a confirmation tone delivered via the audio device 42. The driver ID device 14 may be configured to accept an indication from a driver, for example via a programmable driver ID tag that is unique to the particular system 100, and optionally a user-defined unique location identification.

In some versions, the VDM 10 may assign all recorded vehicle and driver data to the particular driver which is logged on when the data is recorded, for the entire "run" during which the driver was logged in. The "run" ends when the currently logged on driver is logged off. Logoff occurs when another driver is logged on to the system, when no ignition signal 526 signal is detected or no engine rotation signal 24 is detected for a particular duration of time (for example one minute), or when the currently logged on driver logs off of the system. This system logoff may occur when the currently logged on driver performs another logon procedure, for example by swiping the same card through a card reader. The VDM 10 may then confirm the logoff with a tone, for example a different tone or different tone pattern than the logon tone or tone pattern. This may be a double beep for logoff, and a single beep for logon. The VDM 10 may retain in its memory the information about the current driver through the entire vehicle mission or "run," even in the vent of data downloads from VDM 10, uploads, and/or power fail situations.

According to some embodiments of the present invention, the driver may log on to the VDM 10 system via a proximity device like an RFID transceiver, a biometric system, and/or an interface to another data source that may already contain the information about the current driver, such as a crew scheduler software application. If a crew scheduler software application is used by VDM 10 to indicate the current driver, the VDM 10 may prompt the driver for confirmation before logging on the driver, according to embodiments of the present invention.

According to some embodiments of the present invention, the VDM 10 permits remote login through its connection with network 12. For example, a dispatcher, who may be using enterprise workstation 122, may remotely log on a driver or a crew member into the VDM 10 system, according to embodiments of the present invention.

The VDM 10 may deliver via audio device 42 a voice message, or via video display device 40 a video message, at the time of crew member logon. This message, as well as the options for its delivery, may be configurable by the user. For example, a particular driver 112 may configure VDM 10 to deliver the greeting message to the particular driver 112 only once per day, regardless of the number of times that the same driver 112 logs on to the VDM 10 system, according to embodiments of the present invention.

The content of such voice or video messages may also be customized to each user and/or vehicle and/or situation. For example, once VDM 10 determines a particular driver's identity, the VDM 10 may be configured to deliver a voice message that says, "Welcome, driver. This is your _____ login to this vehicle," in which the VDM 10 fills in the blank with a voice representation of a number of times which the same driver has logged on to the same vehicle, for example "first" or "tenth" or "one hundred forty-seventh," according to embodiments of the present invention. According to other embodiments of the present invention, the VDM 10 is configured to provide customized messages to the user based on the user's classification, for example if the user is a supervisor, the VDM 10 says at login "welcome supervisor," but if the user is not a supervisor, the VDM 10 plays at login "welcome driver." This information which the VDM 10 uses to identify whether the driver falls into a particular class may be stored locally in VDM 10, stored remotely in remote database 130, and/or stored on the user's ID media, for example the user's RFID enabled identification badge. The VDM 10 may also recognize, based on the driver's identification or based on previously stored information, that the driver's name is John Doe, and may be configured to deliver a greeting via audio device 42 that says "Welcome John Doe."

In addition to tracking the identity of the current driver, the VDM 10 may also be configured to accept and track the identities of one or more crew members. For example, a crew ID device 14 may be located in the rear cabin 152 and permit a crew member to log in in a fashion similar to the driver login described above. A crew ID device 14 may also be located on the exterior of the vehicle 101, for example on one or both rear corners, to permit a spotter to identify him or herself while at the same time indicating their presence and function as a spotter. Crew identification data may also come to VDM 10 from another application, such as a crew scheduling software application either locally or on enterprise workstation 122, according to embodiments of the present invention. The crew identification and logon process may use the same or different tone, voice messaging, and/or data recording as used for the driver, according to embodiments of the present invention.

In some cases, if the VDM 10 detects the presence of ignition or an RPM signal for the engine (for a customizable, or developer-defined, duration and/or combination of time and presence of a speed parameter), and there is no driver logged in, then the VDM 10 may log in an "unknown driver" for the vehicle data record. The system functionality and reporting capabilities for the unknown driver may be the same as those for known drivers. In some versions, if the VDM 10 detects ignition or an engine RPM signal, and no speed, while the unknown driver is logged on, the VDM 10 may deliver an intermittent tone. If speed is detected while the unknown driver is logged on in such situations, a steady tone may be sent through the audio device 42 by VDM 10.

According to embodiments of the present invention, the VDM 10 delivers a voice message concerning unknown driver activity, for example a voice message that says "Unknown driver" or the like. According to some embodiments of the present invention, the VDM 10 permits customized settings, for example for safety exception/violation reports and driver audible feedback, based on the individual driver identity and/or the group or classification to which the driver is assigned. Such classification or individual identity may be obtained from the crew ID device 14 and/or obtained from an outside data source such as a crew scheduling system, according to embodiments of the present invention. For example, a supervisor may be able to drive at a higher speed than a non-supervisor, without an overspeed violation tone, and a driver having a probationary classification, or an unknown driver, may have lower overspeed settings than both the supervisor and non-supervisor or EMT, according to embodiments of the present invention.

The VDM 10 may also detect an attempted improper driver change and either record or prohibit or warn against the change if a new driver login is received when the vehicle is traveling faster than a predetermined speed, according to embodiments of the present invention.

According to embodiments of the present invention, the VDM 10 tracks seatbelt data and/or seat sensor data for one or more seats. For example, the VDM 10 receives a signal from the seatbelt sensor 18 of the driver 112, and sounds a tone when a vehicle speed is detected while the driver's seatbelt is unfastened or unbuckled, or is unfastened or unbuckled for a user defined period of time. According to embodiments of the present invention, the VDM 10 plays a user customized voice message via audio device 42 when a seat belt violation is detected. According to other embodiments, the VDM 10 receives a signal from seat sensor 19 indicating that an individual is seated in the particular chair, but receives a signal from the corresponding seatbelt sensor 18 indicating that the seatbelt is not fastened for that particular chair, and based on the determination provides an alert to the driver and/or the particular user seated in the seat and/or another crew member, and/or records the seatbelt violation in the vehicle record. The VDM 10 may track the seatbelt status and seating status of each seat in the vehicle, and/or the safety straps and/or presence of a patient in the patient cot, according to embodiments of the present invention. Sensing whether a patient is in the patient's cot or whether the patient is properly restrained in the patient cot may permit the VDM 10 to store data that may be used to evidence compliance with a particular regulation, standard, and/or protocol. The VDM 10 may also be configured to generate a warning message and/or record a safety exception in the vehicle record if the seatbelt is fastened before a user is detected in the chair, according to embodiments of the present invention. The VDM 10 may also interface with other third party systems, or the vehicle's on board systems 20, which also detect the seatbelt and/or seating status for multiple seating positions, according to embodiments of the present invention.

The VDM 10 may also track what may be referred to as "backing" information for the vehicle 101. In large vehicles like ambulances, it is often difficult for the driver to see potential obstacles located behind the vehicle, which must be avoided while backing up the ambulance. Thus, a spotter may be advantageous, because the spotter may stand behind the vehicle and shout information and/or use hand gestures to alert the driver of obstacles, or to direct the driver about which way to turn or how fast to go. A vehicle 101 may include a spotter switch 22. When the VDM 10 senses that the vehicle is in reverse drive, for example from a reverse activation signal 534, and if any vehicle speed is detected for a certain amount of time (e.g. two seconds or more), the VDM 10 may be configured to accept the activation of the spotter switch 22 for a user defined period of time before and after the start of the reverse activation, and the switch activation may serve to indicate the activation for a user defined period of time, which may eliminate the need for multiple switch depressions during subsequent back-and-forth backing maneuvers. This may be particularly beneficial for a parallel parking maneuver, according to embodiments of the present invention.

The backing alerts and reporting activation criteria (for entry into the vehicle record) may be user configurable on a vehicle-by-vehicle basis. If the VDM 10 begins to implement the spotter logic, and does not detect a spotter switch 22 activation, an intermittent tone may be produced to remind the driver of the spotter requirement. Detection of the spotter switch 22 activation may halt the tone. If the user-defined time parameters expire during a detected backing occurrence, and if there has been no spotter switch 22 activation, a steady tone for a limited length of time may be produced, indicating that a violation has occurred. If the time parameter expires while the vehicle is still in reverse, the violation tone may continue until the vehicle is taken out of reverse or the spotter switch 22 is activated, according to embodiments of the present invention.

According to some embodiments of the present invention, a switch or other indicating device accessible from the driver's seat, or simply a detection of the reverse activity by the VDM 10, may activate a backing camera, for example a video camera in position 4 in FIG. 6, which may substitute for an activation of the spotter button. Also, a user-defined voice message or video message may be played in addition to, or instead of, the tone activity for a backing violation, according to embodiments of the present invention. According to other embodiments of the present invention, the backing parameters of the VDM 10 are configurable, for example the VDM 10 may determine that a supervisor is logged as the current driver, and then disable the backing warning systems and violation recording. According to embodiments of the present invention, a crew member ID device 14 is placed at or near the back of the vehicle 101, for example at or near the spotter switch 22, and is used by the VDM 10 to determine an identity of a crew member who is serving as the spotter.

The VDM 10 according to embodiments of the present invention may sense specific forces (e.g. G-forces) experienced by the vehicle 101, and/or calculate acceleration experienced by the vehicle 101, and determine a force value based on the measurements and/or calculations. According to some embodiments of the present invention, the VDM 10 uses the accelerometer 16, which may be a dual- or triple-axis accelerometer, to determine an instantaneous specific force being experienced by the vehicle 101. For this purpose, the accelerometer 16 may be rigidly fixed to the vehicle 101, such that any acceleration experienced by the vehicle 101 are also experienced by the accelerometer 16. The instantaneous specific force may include one force component substantially aligned with the direction of normal travel of the vehicle 101, for example the front-to-back direction. The instantaneous specific force may also include a force component substantially perpendicular to the direction of normal travel, for example the side-to-side direction. According to some embodiments of the present invention, the VDM 10 receives from accelerometer 16, and/or determines based on signals received from the accelerometer 16, an instantaneous specific force that is a magnitude of the vector sum formed by the front-to-back force vector component and the side-to-side force vector component. This instantaneous specific force magnitude may be referred to as an accelerometer specific force.

According to other embodiments of the present invention, the VDM 10 receives from accelerometer 16, and/or determines based on signals received from the accelerometer 16, an instantaneous specific force that is a magnitude of the vector sum formed by the front-to-back force vector component, and any side-to-side force vector component experienced while the speed of the vehicle is above a certain speed setpoint. This "masking" of the side-to-side force vector component based on vehicle speed may assist VDM 10 in filtering "false" or undesired overforce readings caused, for example, by centripetal force exerted on the vehicle 101 when the vehicle 101 is turning. As used herein, the term "instantaneous" when applied to a force or speed or other measurement or value is used in its broadest sense to refer to a particular value at the moment in time, and/or an averaged value over times at or near to the particular moment in time, and/or smoothed values over times at or near to the particular time. For example, the VDM 10 may use, when implementing its logic, an instantaneous specific force magnitude that is determined from averaging accelerometer 16 measurements made each ten milliseconds.

The VDM 10 may also determine actual vehicle 101 acceleration in a different way, for comparison with the accelerometer specific force (both of which may be expressed in distance per square second). The VDM 10 receives high precision speed information from speed sensor 24, for example in the form of pulses or "clicks" which may be counted over time. As on example, a very high precision speed sensor may be configured to provide several thousand discrete pulses or clicks for a given revolution of the drive shaft and/or axle and/or vehicle wheel. This permits the VDM 10 to determine an instantaneous speed of the vehicle 101, for example by measuring average time between pulses. The VDM 10 may calculate a rate of change of the instantaneous vehicle speed to determine an instantaneous acceleration. Prefiltering may be used for the accelerometer 12 and/or speed sensor 24 signals in order to smooth the signals, according to embodiments of the present invention.

According to some embodiments of the present invention, the VDM 10 compares, for a particular moment in time or range of time, the accelerometer specific force with the instantaneous acceleration, and uses the lower value of the two as the current observed acceleration of the vehicle. This may reduce the probability of obtaining "false" or undesirable overforce alerts or records when one device experiences an anomalistic spike based on activity unrelated to unsafe driving. For example, the accelerometer 16 may sense a spike in specific force if the vehicle 101 hits a bump in the road, while the instantaneous acceleration falls well within the acceptable range—using the lower observed acceleration value may prevent a warning tone and a violation record. The VDM 10 compares the current observed acceleration of the vehicle to a preset acceleration (or g-force) value. This preset acceleration or g-force value may be referred to as the "safe force." The safe force may be similar to the SAFEFORCE® value as measured by the ZOLL RescueNet Road Safety system, according to embodiments of the present invention. When the observed acceleration exceeds the safe force, the VDM 10 may be configured to alert the crew member (e.g. the driver), and/or create an entry in the vehicle record to reflect a safety violation.

According to some embodiments of the present invention, the VDM 10 is configured to warn the driver before the observed acceleration reaches the safe force. For example, the VDM 10 may be configured to provide, through the audio device 42, a growling noise when the observed acceleration exceeds eighty percent of the safe force value. The VDM 10 may be configured to escalate the growling noise to an intermittent tone indication when the observed acceleration exceeds ninety percent of the safe force value, and may be configured to provide a loud steady tone noise/alarm when the observed acceleration exceeds the safe force value, to indicate an actual violation, according to embodiments of the present invention. These ranges and/or tones may be customized, for example, the growling may indicate an observed acceleration of ninety to one hundred percent of safe force, a steady tone may indicate an observed acceleration of 100 to 110% of safe force, and a strong tone or alarm may indicate a severe overforce condition of over 110% of safe force, according to embodiments of the present invention.

According to other embodiments of the present invention, the VDM 10 may be configured to implement a "grace period" before warning a driver and/or recording a safety exception in the vehicle record. For example, the VDM 10 may be configured to identify a particular condition only if the condition is maintained for a particular amount of time, for example at least a half second. According to other embodiments, the VDM 10 is configured to provide to the user a voice message, video message, or other indication that the user is about to be warned of, and/or reported as, violating a safety rule, and to give the user a certain amount of time to correct the perceived safety violation.

According to embodiments of the present invention, the user (e.g. the vehicle fleet manager) may define force settings or values as percentages of the safe force. For example, the user may define a warning range, a low overforce range, and a high overforce range. When the observed acceleration reaches the warning setting, the VDM 10 produces a growl (e.g. through audio device 42). As the force level increases, the frequency of the growl may increase (from slow to fast), until a low overforce setting is reached. When the low overforce setting is reached or exceeded, the VDM 10 may produce a steady tone for the duration of the low overforce occurrence. When the observed acceleration reaches or exceeds the value of the high overforce setting, the VDM 10 may produce a tone of a higher frequency during the entire time when the high overforce condition is detected. According to some embodiments of the present invention, the VDM 10 causes a growl to be produced for at least one second, to indicate a warning before noting any violation.

According to some embodiments of the present invention, the warning and overforce ranges may be configurable, for example configurable based on the drivers identity. The VDM 10 may determine the driver's identity via the crew ID device 14, and then set the warning and overforce ranges accordingly. For example, when the driver 112 is determined to have a vehicle maintenance personnel classification, the VDM 10 may be configured to raise the warning and overforce settings much higher to facilitate vehicle problem diagnosis by the driver.

The VDM 10 according to some embodiments of the present invention is also configured to monitor vehicle speed, and in overspeed conditions to notify the driver and/or crew, and/or to record a violation in the vehicle record. The VDM 10 may be configured with different settings for emergency and non-emergency driving. For example, emergency driving may permit higher safe force values that non-emergency driving. The emergency driving setting may be activated with a button or switch. For example, the VDM 10 may be configured to enter the emergency driving settings when it detects that the emergency lights 504 and/or sirens 514 have been activated. According to some embodiments of the present invention, the VDM 10 may be configured to accept a remote command, for example from a dispatcher 124 via an enterprise workstation 122, to activate or de-activate emergency driving settings. For example, when the dispatcher 124 sends out an EMS response command via enterprise workstation 122, and a particular vehicle 101 indicates (for example in its navigation system 30) that it is responding, the authorization to VDM 10 to enter emergency driving status may be received either with the initial dispatch, or via a subsequent automatic or manual activation by the dispatcher 124 via workstation 122.

Emergency and non-emergency driving settings may include various settings, similar to the safe force settings. For example, the VDM 10 may be configured to act upon an overspeed setting, a high overspeed setting, and a duration setting. The overspeed and high overspeed values may be set as either a maximum speed (e.g. in miles per hour or kilometers per hour). According to some embodiments of the present invention, the VDM 10 receives location information and/or posted speed limit information from the navigation system 30, in order to determine the posted speed limit at the current vehicle 101 location. The overspeed and high overspeed values may alternatively be set as a value by which the driver may exceed the posted speed limit, or the assigned speed limit for the particular road classification (e.g. highway, dirt road). The VDM 10 accessing base speed limit information from a mapping database, for example the mapping database of navigation system 30 and/or other database accessible via network 12, may be referred to as dynamic overspeed determination. The VDM 10 may be configured to measure a duration for which a particular overspeed condition has been observed, and may also be configured to accept a particular overspeed duration setting.

When the vehicle 101 is operated in the overspeed range, the VDM 10 may cause an audible growl to be emitted. If the overspeed time exceeds the duration setting, the VDM 10 may change the audible growl to an audible violation tone, and may continue the tone until the vehicle 101 speed drops below the overspeed setting, according to embodiments of the present invention.

When the vehicle 101 is operated in the high overspeed range, the VDM 10 may be configured to cause a tone at a higher frequency, for example without any duration setting or grace period. The tone may continue until the speed drops below the high overspeed setting, but may remain toning at a lower frequency if the vehicle is still in an overspeed condition, according to embodiments of the present invention.

According to some embodiments of the present invention, the VDM 10 may be configured to provide a voice message and/or video message to indicate to the driver an overspeed, high overspeed, and/or grace period condition. According to some embodiments, speed settings may be configurable based on driver identification. For example, new drivers, inexperienced drivers, or drivers who are new to the particular vehicle 101, may have lower configured overspeed settings than more experienced drivers.

The VDM 10 may provide alerts to the driver for other conditions, for example, an indication that the vehicle 101 is in motion with the parking brake on. The VDM 10 may also include an audio output port to interface with other OEM and/or aftermarket audio systems, for example Firecom® communications systems. According to some embodiments of the present invention, the VDM 10 may be configured to provide seatbelt status information via the video display device 40. The VDM 10 may also be configured to provide a visual force indicator via the video display device 40; for example, the VDM 10 may use colors and/or shapes to express a magnitude of overforce and/or overspeed violations (e.g. red for high overforce, yellow for low overforce, and green for no violation). A visual force indicator may also be used that is not part of a video display device 40; for example, an LED panel may progressively light up additional LEDs as the force gets higher, and may change color to the overforce or high overforce conditions, or overspeed and high overspeed conditions.

The VDM 10 may also perform other roles, for example providing a voice message via video display device 40 if it determines that the vehicle 101 has been idling for an excess (e.g. user-defined) period of time. This may be detected by the VDM 10 receiving a signal that the ignition 526 is active, while receiving a zero speed signal from the speed sensor 24 for the particular period of time.

The VDM 10 may also be communicably coupled to one or more panic buttons, which activate an alarm when pushed or activated. Such buttons may be configured to notify the VDM 10 to activate the light system 36, sirens 514, emergency lights 504, lighting system 532, and/or other systems, according to embodiments of the present invention. The VDM 10 may also be configured to provide voice messaging and/or video messaging to the crew to alert the crew to a potential maintenance concern with the vehicle 101 based on signals from the internal on board diagnostics system 20, for example low oil pressure, high coolant temperature, high brake temperature, check engine signal, and the like. The VDM 10 may also be configured to monitor maintenance-related info, both with respect to time and over time, such as distances driven, active engine time, and engine distance.

The VDM 10 may also be configured to provide user-defined voice messages and/or video messages for user defined events that are not related to vehicle operation, for example a reminder to gather all equipment following an EMS response. The VDM 10 may also be configured to provide driver notification, as well as log in the vehicle record, other types of driving violations. For example, the VDM 10 may be communicably coupled to a proximity sensor at the front and/or rear of the vehicle 101, and may be configured to monitor whether the vehicle 101 is too close to a vehicle in front (e.g. "tailgating") or a vehicle behind. The VDM 10 may be communicably coupled with a vibration sensor or other sensor capable of determining whether the vehicle 101 is veering or committing lane departure, and warn the driver and log the condition accordingly. The vibration sensor may be used, for example, to determine whether one or more of the wheels is driving over the shoulder warning track.

According to some embodiments of the present invention, the VDM 10 permits real time voice over IP messaging, for example via network 12. The driver 112 may communicate with a dispatcher 124 with back-and-forth voice communications via VDM 10, which may include both live voice communications and/or prerecorded and prompted (either automatically or manually) voice messages. Such audio communication may be accomplished via audio device 42, and/or via the sound system or radio 510 of the vehicle 101, according to embodiments of the present invention.

With its communicable coupling to network 12, the VDM 10 may also be configured to provide both local (LAN) and remote (WAN) communications of data, including ad hoc requests for the vehicle data record or portions thereof, as well as continuous streaming or real-time communication of vehicle record data. The VDM 10 may permit a user to download and upload data via an existing Wi-Fi network, for example by including a Wi-Fi card as part of the VDM 10, according to embodiments of the present invention. The VDM 10 may also permit a user to download and upload data via cellular connection to a cellular data modem or air card; according to some embodiments of the present invention, the VDM 10 utilizes and manages cellular communications through its own cellular "dongle" and/or SIM card. This functionality may be accomplished, for example, by using a wireless EMS communications interface device with the VDM 10, for example those described in Patent Cooperation Treaty Application Serial No. PCT/US11/31868, filed on Apr. 9, 2011, which is incorporated by reference herein in its entirety for all purposes.

According to embodiments of the present invention, the VDM 10 may interface with, and/or be communicably coupled with, multiple device and applications for the purpose of sharing data, for example via Ethernet and Wi-Fi connections. For example, the VDM 10 may interface with the navigation system 30 as described above to obtain road segment information in order to set dynamic overspeed conditions. The VDM 10 may alternatively carry mapping information internally, to enable dynamic overspeed determinations. In some cases, the mapping information stored on VDM 10 may be periodically updated via network 12. The VDM 10 may also be configured to determine and/or note in the vehicle record whether the vehicle 101 is within a school zone, according to embodiments of the present invention.

The VDM 10 may also be configured to provide data to other applications, for example an EMS data management suite, for example ZOLL RescueNet®. This may be done by cellular connection, for example, or by 900 MHz radio which may communicate through a serial connection, to download and upload data. The VDM 10 may serve as a Wi-Fi hotspot, enabling other applications to utilize the VDM's cellular or other connectivity; the VDM 10 may also communicate with other devices via Bluetooth®.

According to some embodiments of the present invention, a user (for example a dispatcher) may connect to the VDM 10 via Wi-Fi, cellular, and/or USB hard wire and view the status and values of all (or any subset of specified) monitored and controlled vehicle and driver activities in real time. The VDM 10 may continue to monitor and control notifications even during communications, including downloading and uploading of vehicle record data. The VDM 10 may communicate with the vehicle computer (for example using OBDII and J protocols), and may send requests for data to the vehicle computer system 20, according to embodiments of the present invention. The VDM 10 may be configured to communicate with vehicle computer systems 20 made according to the standards in various international markets, including the United Kingdom, Europe, South America, US, and elsewhere. The VDM 10 may also be user configurable to prioritize and schedule Wi-Fi and cellular communications, so as to minimize the impact to cellular bandwidth. For example, the VDM 10 may be configured to communicate via network 12 during non-peak cellular usage hours.

The VDM 10 may also be configured to enhance a user's experience when interacting with the system 100. For example, the VDM 10 software may be written to an enterprise data store, for example data store 130. Back-end database 130 may store such data about the vehicle record from VDM 10, and such data may be accessed with a certain set of services, for example proprietary or open web services, according to embodiments of the present invention. protocols, in order to provide a web application accessible from enterprise workstation 122, personal computers, smart phones, iPads®, and other devices with internet connectivity, via encrypted secured connections. The application software for accessing the VDM 10 data may reside on the end user's server and/or a server hosted by the VDM 10 manufacturer, according to embodiments of the present invention. The system administrator 134 for system 100 may control the quantity and the specified serial numbers (or other unique identification numbers) of the VDM 10 devices supported by the application. The system administrator 134, via the enterprise environment 103, may also control the number of drivers that the system will support. For example, the enterprise user 124 may obtain from the system administrator 134 the rights to have the data from up to five VDM 10 devices accessed via enterprise workstation 122. If the enterprise user wanted to add a sixth VDM 10 to the web interface system, the enterprise user would need to obtain activation from the system administrator 134, according to embodiments of the present invention.

The enterprise environment 103, including enterprise application server 128 and enterprise storage server 126, may be configured to enable and disable specific functions within the application program, and set time parameters for the expiration of specific functions or operability. The application program may be password protected, enabling users to assign specific access and control levels to various multiple users. The system administrator 134 may be given an override and/or "back door" access to the application program in the enterprise application server 128, for example. For example, if the VDM 10, or the enterprise user 124, discovers that the vehicle 101 associated with the VDM 10 has been stolen, the enterprise user 124 may remotely disable the vehicle, for example by sending a command via VDM 10 to end the engine ignition 526, according to embodiments of the present invention. The VDM 10 may be configured with a battery power source, and upon receiving an indication of having been stolen or lost, the VDM 10 may continue to power itself and the GPS 32, so as to permit location of the stolen or lost vehicle 101 using VDM 10, according to embodiments of the present invention.

The enterprise environment 103 may be configured to store some of all of the vehicle data record, including both driver safety and medical/patient encounter information, for all vehicles and all encounters, according to embodiments of the present invention. The enterprise storage server 126 and/or enterprise application server 128, which may be a single server or separate servers, may be configured to permit access to the vehicle record data, to permit report generation based on a number of different user selectable factors, including time, vehicle ID, driver ID, and other factors.

Report generation may be accomplished on a periodic (e.g. daily, weekly, monthly) basis, and/or may be done on an ad hoc basis by an enterprise workstation 122 accessing the enterprise application server 128. Reports may be accessible and/or delivered in an electronic format, for example a spreadsheet format. Report generation may be password protected, and access to all reporting data may be limited to an individual, a specified group of individuals, or all individuals (e.g. full access), according to embodiments of the present invention. Access to specific reports, for example vehicle maintenance reports, may be controlled, according to embodiments of the present invention.

The reports accessible via enterprise application server 128 may include some of all of the data collected by the VDM 10, for some of all of the VDMs 10 in the particular fleet or the particular system 100. The enterprise user 124 may establish a profile and/or set various configuration settings, which may be stored on the enterprise application server 128 and/or the enterprise workstation 122. The reports generated may access the profile and/or configuration settings to determine which data to display, and how to display it. For example, the reporting module may be configurable to show or toggle between US customary and metric values for measurements. Most report generation may be accessed from a single, user-friendly query screen displayed on enterprise workstation 122, according to embodiments of the present invention. To simplify the menu and the screen, some of the selection defaults or drop-down menus may be displayed and selected on a sub-screen or other configuration screen, according to embodiments of the present invention.

The report query screen may allow the user to select individual vehicles, a group of vehicles, or all vehicles, and show vehicle data records or statistics for the vehicle(s), according to embodiments of the present invention. The report query screen may allow the user to select individual drivers, a group of drivers, or all drivers, and show vehicle data records or statistics for the selected driver(s), according to embodiments of the present invention. The report query may allow the user to create reports based on a specific driver or group of drivers that operated a specific vehicle or group of vehicles, according to embodiments of the present invention. The report query may allow a user to select a date and/or time range, according to embodiments of the present invention. The default time range in the report query interface may be by twenty-four hour increments (e.g. the time default is midnight), but the time range may also be editable to select a more precise range, according to embodiments of the present invention. The report query may also permit a user to filter information displayed in the report based on a minimum distance traveled (for example in tenths of a mile or kilometer) and/or time duration (in seconds) for specific events, according to embodiments of the present invention.

The report query may provide for the selection of a summary of the requested data, or trends for the selected data, based on user-defined trend periods, which may not apply for some reports. The report query may also allow the user to include or exclude active or inactive vehicles, and/or active or inactive drivers. The report query may further permit the user to consolidate data from like named vehicles and/or like named drivers, or have like named vehicles and/or drivers listed separately, according to embodiments of the present invention. This capability may be helpful in systems which include multiple driver identification tags assigned to the same driver, with the lost or inactive tags being placed onto an inactive list, according to embodiments of the present invention.

The report query may permit the user to include or omit indicators that there is no data available for portions of the selected query date, vehicle, and/or driver, according to embodiments of the present invention. The user may save, name, and later load, user-created queries. When the user loads a user-created query, the query may automatically populate with the most recent and accurate results, according to embodiments of the present invention. The user may export data from, and/or print reports, according to embodiments of the present invention.

The enterprise application server 128 may be configured to provide a "run report" to users 124. The run report may display the date and/or time of run start and run end, duration of run, distance traveled, and driver login information during the run. A run may be a continuous driver log on event, for example, or may be a particular patient transport, for example. A driver logon may occur as described, above, including an "unknown driver" login for runs without an identified driver. The driver may be logged off when the ignition is cycled off, another driver is logged in, and/or the appropriate action is taken to log off the currently logged in driver (for example touching the currently logged in driver ID tag to the crew member ID device 14). Multiple consecutive driver login activity from the same driver, without intervening ignition and/or vehicle speed activity, may be consolidated into one run. The run report may display a summary of the number of runs, total distance traveled, and/or total run time. An example of a run report as it may be displayed via web interface with server 128 is illustrated at FIG. 9, according to embodiments of the present invention.

The enterprise application server 128 may also be configured to provide a "run report—detail" which, in addition to some or all of the data displayed in the "run report," may include a subset of data for each run including the description, time, duration, and maximum value of any violation (e.g. overforce or overspeed) that occurred during the run, according to embodiments of the present invention. The violations indicated may include, for example, speeding, overforce, seatbelt violations, backing violations, and/or excess idle times. The detailed run report may also display a summary of the number of runs, total distance traveled, and/or total run time, according to embodiments of the present invention. According to some embodiments of the present invention, when the user is viewing a run report, the user can activate a "hot key" to toggle between the run report and a map or video of the specific run.

The violations displayed in the detailed run report may include any user defined events that occurred during the run, and may also include a dispatch identifier such as those generated by dispatch software for each run.

Figure 12:
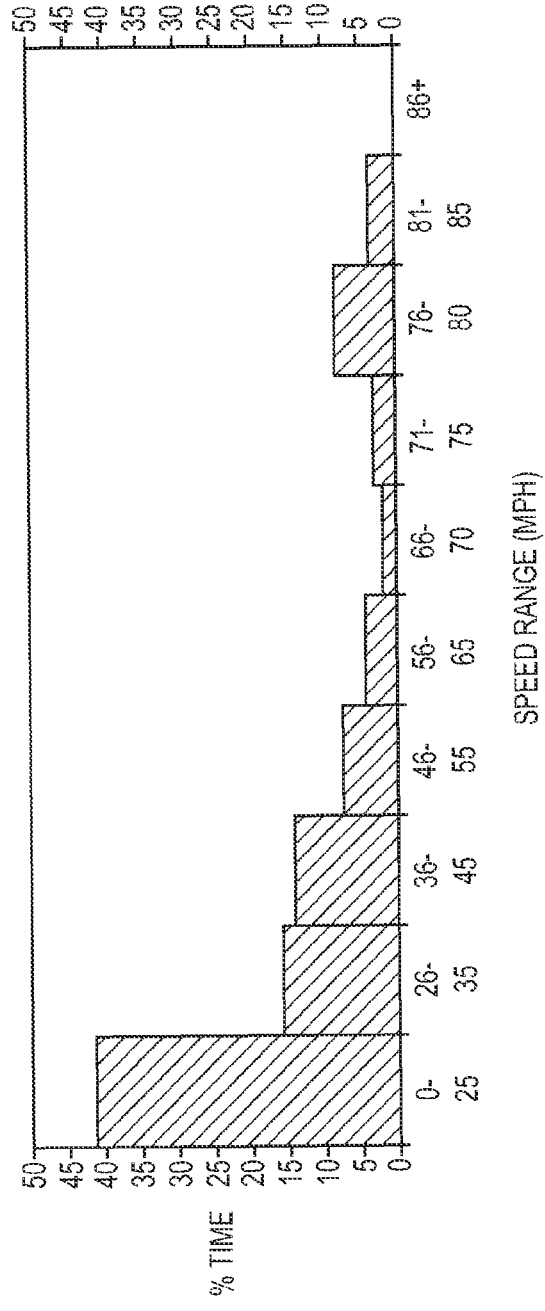
FIG. 12 illustrates a speed graph summary report, according to embodiments of the present invention.

The enterprise application server 128 may also be configured to provide an "overspeed report." The overspeed report may display a date and/or time of an overspeed, the overspeed duration, the distance traveled, the maximum speed, the driver identification, and/or indicate whether the overspeed occurred while running in emergency mode, according to embodiments of the present invention. The overspeed report may summarize the total number, duration, and distance of overspeeds, and compare such totals to the total run time and distance traveled for the vehicles and/or drivers identified in the query, according to embodiments of the present invention. According to some embodiments of the present invention, the overspeed report may further include posted speed limit information for the time when the overspeed occurrence occurred, according to embodiments of the present invention. An example of an overspeed report as it may be generated by server 128 via web interface is illustrated at FIG. 11, according to embodiments of the present invention. FIG. 12 illustrates a report showing speed range data as a percentage of time for a particular day/time range, according to embodiments of the present invention.

The enterprise application server 128 may also be configured to provide an "overforce report." The overforce report may display a date and/or time of an overforce event, the total duration of the overforce event, the high overforce duration time, the maximum overforce observed acceleration value, the primary direction of the overforce (e.g. acceleration, deceleration, right turn, or left turn), an identification of the driver, and an indication of whether the overforce occurred while the VDM 10 was in emergency mode. The overforce report may also summarize the total number and duration of overforce events, and compare such totals to the total run time and/or distance traveled for the vehicles and drivers queried, according to embodiments of the present invention.

The enterprise application server 128 may also be configured to provide a "seatbelt report," which may display a date and/or time of a seatbelt violation, the duration of the violation, the distance traveled under violation, and whether the violation occurred while running in emergency mode. The seatbelt report may include an identification of the particular seating position or positions for which the violation occurred, and may summarize the total number, duration, and distance traveled for seatbelt violations. The seatbelt report may also include a comparison of such totals to the total run time and/or distance traveled for the particular vehicles and/or drivers in question.

The enterprise application server 128 may also be configured to provide a "backing report," which may display a date and/or time of a backing violation, the duration of the violation, the distance (for example to the hundredth of a mile or kilometer) for the backing violation, the driver identification, and an indication of whether the backing violation occurred while the VDM 10 was in emergency mode, according to embodiments of the present invention. The backing report may include all backing incidents, indicating which incidents were in violation, and summarizing a comparison of the total incidents to those that were and/or were not indicated as violations, according to embodiments of the present invention. Such reports may also include identity information for the ground guide, or spotter, who served to assist the driver in the backing procedure.

The enterprise application server 128 may also be configured to provide an "idle report," which may display the date and/or time of an idling violation, the duration, the maximum idle time value, the driver identity, and whether the violation occurred while in emergency mode. The percent of time parameter may be defined by the user for emergency mode operation, according to embodiments of the present invention. The idle report may also summarize the total number and duration of idle violations, and include a comparison of such totals to the total run time and distance traveled for the vehicles and/or drivers in question.

The enterprise application server 128 may also be configured to provide a "daily distance report," which may display the beginning odometer reading, ending odometer reading, and total distance traveled for each day over a particular period of time, according to embodiments of the present invention. The daily distance report may summarize average daily distance and total distance traveled for each queried vehicle, and the average daily distance and cumulative distance traveled for all queried vehicles, according to embodiments of the present invention.

The enterprise application server 128 may also be configured to provide a "driver log report," which may display log on and log off data and time, vehicle identity, driver identity, duration, and distance traveled during log in activity, for a particular period of time, according to embodiments of the present invention. The driver log report may also display a method of login used by the driver, for example manual login, keypad login, magnetic card reader login, RFID login, face recognition login, and/or the like.

The enterprise application server 128 may also be configured to provide an "event report," which may permit the user to create and view custom reports based on user identifiable parameters using a logical expression. For example, to create an event report, the user may request a display of all data for times when the parking brake was activated and the vehicle 101 was moving (e.g. had a positive speed value) for ten seconds or more. The enterprise storage server 126 may capture, record, and store into database 130 all data from VDM 10 in a high resolution, second-by-second format. The enterprise application server 128 may permit users to create reports from the data based on ad hoc queries. For example, the user could query all instances of data for a specific driver in a specific vehicle that was traveling in excess of twenty-three miles per hour with the windshield wipers on and the siren off for a duration of sixty-three seconds or more. In such situations, the VDM 10 is not preprogrammed to record such specific parameters, but the fact that all of the data from the VDM 10 (and/or a high resolution version of the data from the VDM 10) has been captured by the enterprise environment 103 permits such specific reports to be compiled. FIG. 10 illustrates an example of an event report as it may be displayed by server 128 via a web browser interface, according to embodiments of the present invention.

The enterprise application server 128 may also be configured to provide a "last download report," which may display a list of all vehicles 101 and/or VDM systems 10, the date and/or time of the last data download from that VDM 10, the starting date and time corresponding to the data that was downloaded, the odometer reading at the time of download, and/or the following information that may have occurred during the download period: distance traveled, unknown driver distance, maintenance trouble codes recorded, flagged driver activity (e.g. a lost driver tag or ID device), a power failure (e.g. the VDM 10 hardware is unplugged), and/or egregious occurrences and/or events (e.g. high overforce, high overspeed events). The last download report may also include a VDM 10 firmware version, and indicate whether any holes or gaps exist within the data (for example, by comparing previous download date/time stamps to current download date/time stamps). The last download report may also include a display of user defined events, for example those events deemed to be egregious safety violations. The last download report may also display the last day and/or time that the VDM 10 responded to an application "ping," which may be set at a user defined interval, according to embodiments of the present invention. An example of a last download report as displayed via a web interface with server 128 is illustrated at FIG. 8, according to embodiments of the present invention.

The enterprise application server 128 may also be configured to provide a "digital input report," which displays the number of all digital input activations, duration of the activation, and distance traveled while activated. The digital input report may also provide an identification of the type of each activation, for example an identification of the device providing information via the digital input, according to embodiments of the present invention.

The enterprise application server 128 may also be configured to provide an "analog input report," which may display values with date and/or time stamps for analog input activity. The default display for the analog input report may be in graphical format, which may be displayed so as to allow the user to identify the device being monitored and/or an interpretation of what the values from the device mean. For example, the device output may be registering a signal of 3.5 volts, which means that the ambient air temperature is sixteen degrees Celsius. The system may also provide the analog input data in a spreadsheet type format, according to embodiments of the present invention.

The enterprise application server 128 may also be configured to provide a "speed ranges report," which may display the time spent and distance traveled while within user-defined speed ranges. The report may include averages for all queried vehicles and/or drivers, according to embodiments of the present invention.

The enterprise application server 128 may also be configured to provide a "throttle position report," which may provide a date, time, duration, and/or value of the throttle position activity which exceeds user-defined parameters for the throttle position, according to embodiments of the present invention.

The enterprise application server 128 may also be configured to provide a "maintenance report," which may display any trouble codes recorded during a particular period of time, a particular run or set of runs, for a particular vehicle, according to embodiments of the present invention. These trouble codes may be received from the vehicle OBD 20 system, according to embodiments of the present invention.

The enterprise application server 128 may also be configured to provide a "fuel report," which may indicate date, time, and odometer reading of each detected refueling activity, according to embodiments of the present invention. The fuel report may also indicate occurrences of dramatic fuel loss, which may help to detect fuel theft and/or major fuel line rupture. The VDM 10 may be communicably coupled to a fuel level sensor that operates independent of a power source, and/or that operates with battery power, for example the battery power that powers VDM 10 while the vehicle ignition is off; as such, the VDM 10 may detect fuel loss events and enter them into the vehicle record even when the vehicle 101 is turned off, according to embodiments of the present invention. According to some embodiments of the present invention, the VDM 10 compares the fuel level at vehicle shutoff with the fuel level at vehicle startup, in order to determine whether a major fuel loss event (e.g. theft) has occurred.

The enterprise application server 128 may also be configured to provide a "vehicle utilization report," which may include distance, total time, park time, run time, move time, and/or idle time, according to embodiments of the present invention. The vehicle utilization report may also display a comparison of any or all parameters (except distance) with respect to a total time. The vehicle utilization report may also display averages for all queried vehicles and/or drivers, according to embodiments of the present invention.

The enterprise application server 128 may also be configured to provide a "safety report," which may display distance, low overforce, high overforce, low overspeed, high overspeed, seatbelt violations, and/or backing incidents according to driver and/or vehicle. A grade level may be assigned to each vehicle or driver. The level assigned to each vehicle or driver may include determining the level according to the following calculations. The miles driven may be divided by a number of counts to arrive at the score. Each second in an overforce or overspeed condition may equal one count, and each second in a high overforce or high overspeed condition may equal a user-defined number of counts. Each unsafe backing occurrence may equal a user defined number of counts. If the calculated score is greater than 250, then the level 10 may be assigned to the particular driver or vehicle. If the calculated score is 128 to 250, then level 9 may be assigned; if 64 to less than 128, then the level 8 may be assigned; if 32 to less than 64, then the level 7 may be assigned; if 16 to less than 32, then level 6 may be assigned; if 8 to less than 16, then level 5 may be assigned; if 4 to less than 8, then level 4 may be assigned; if 2 to less than 4, then level 3 may be assigned; if 1 to less than 2, level 2 may be assigned; and if less than 1, level 1 may be assigned, according to embodiments of the present invention. FIG. 13 illustrates an example of a driver safety report as it may be displayed by server 128 via a remote internet interface, according to embodiments of the present invention.

The safety report may display the drivers or vehicles above or below a user-defined standard line, based on level, and/or display fleet or driver totals, according to embodiments of the present invention. If a driver has zero counts, then the score level may be displayed as the miles driven multiplied by a factor of two, with a minimum level score that correlates to the minimum value of which the standard line is placed (for example, if the driver drove 2.3 miles and had no counts, and the standard line was set at level 5, that driver's score would be 8.0, putting the driver just over the standard line). The safety report may display total driving, emergency driving only, non emergency driving only, and may also have the ability to mask the drive name, for example by displaying only each driver's unique employee number or other user-defined identification. The safety report may also be sortable alphabetically and/or by the level score.

The enterprise application server 128 may also be configured to provide a "grading report," which may permit the user to specify specific occurrences and events, and the data values attributed to such occurrences and events. For example, the user may wish to create a "green report" that grades driver performance as it relates to speed, forces, throttle position, oxygen sensor values, and idle time, which are all factors which tend to have a higher degree of relevance to the environment.

The enterprise application server 128 may also be configured to provide a "second-by-second report," which may display a user-defined date and/or time period, and resolution of all monitored inputs and indicators in a graphical format, with time being the horizontal axis and the value and description of the input displayed on the vertical axis. The displays may overlay each other, and the user may be able to toggle on or off the input display and the corresponding values, according to embodiments of the present invention. The second-by-second report may also permit the user to directly access a video presentation of a selected portion of the second-by-second graph, for example with a mouse click and/or a hot key. According to some embodiments of the present invention, video information sent to the VDM 10 after being captured by the video capture device 26 is displayed overlayed in the same graphical format, with snapshots taken from the video footage at periodic time intervals corresponding to the location at which the snapshot is displayed on the timeline, according to embodiments of the present invention. The second-by-second report may also permit the user to directly access (e.g. with a mouse click or a hot key activation) a map representing the location of the vehicle corresponding to the time of the selected portion of the second-by-second graph. The second-by-second report may also display and/or be available for export in a text format, according to embodiments of the present invention. The second-by-second report may also be configured to include or display data from a third-party software application, for example the dispatch number taken from an EMS dispatch software application, according to embodiments of the present invention. The VDM 10 may be configured to use a time given by a GPS 30 signal for vehicle data records or other time synchronized device, according to embodiments of the present invention. According to some embodiments of the present invention, all reports, via a date/time stamp correlation, permit the user to access the corresponding video information in the vehicle data record. According to some embodiments of the present invention, when a user (e.g. an enterprise user 124) watches video collected by VDM 10, the user sees other data overlayed onto the video data, for example speed limit information, information about the driver, information about weather conditions, and other relevant information. According to some embodiments of the present invention, such information may be displayed in a "heads up" type of format for the user.

According to embodiments of the present invention, the user may directly access particular detailed data from any graphical report with a time axis, by selecting a particular time range or event from the time axis. For example, in any report, including those described above, the user may directly access (e.g. with a mouse click and/or hot key activation) the corresponding video footage for any date and/or time, or any date and/or time range, according to embodiments of the present invention. As another example, the user may directly access corresponding map information displaying the location of the vehicle for any date and/or time selected in any report, according to embodiments of the present invention.

According to embodiments of the present invention, the enterprise application server 128 may also be configured to permit a user to edit values that may ultimately be displayed in various reports and exports; the edits may be logged and saved in a protected, (for example non-editable) edit log. The enterprise application server 128 may be configured so as not to permit such edits to compromise integrity of certain data in relation to crash reports, employee disputes, or any other formal or legal proceedings; for example, in some embodiments, the second-by-second data is not editable, but data in another table or report is editable. According to embodiments of the present invention, the edit process permits users to edit multiple records with a minimal amount of effort.

According to some embodiments of the present invention, the VDM 10 logs each two-way communication, and/or each two-way communication session, with the enterprise environment 103. The VDM 10 may also be configured to record the occurrence of a driver setup change, and/or a vehicle setup change. VDM 10 may also be configured for one-way communication, and/or three-way communication, and/or multiple directional communication, according to embodiments of the present invention.

According to some embodiments of the present invention, the web application hosted by application server 128 is configured to alert a user (e.g. 124) to any incident for which the driver may receive a violation tone or message. The web application may alert the user to any idle incident that exceeds the user-defined period of time. The web application may be configured to alert the user to any user-defined event, according to embodiments of the present invention. The web application may be configure to cause the alert to remain on the screen for a user-defined period of time, and/or until dismissed by the user. According to some embodiments of the present invention, the user may enable or disable any and all alerts.

The VDM 10 may send e-mails to user-designated e-mail addresses when a user-defined alert incident occurs. The VDM 10 may also send an alert and alarm if a driver panic button (or crew panic button) is activated. According to some embodiments of the present invention, the VDM 10 is communicably coupled to multiple panic buttons within the vehicle 101. The VDM 10 may also provide an e-mail alert, or other message, to an enterprise workstation 122, in the event of an air bag deployment and/or excess observed acceleration value. The VDM 10 may also be configured to provide an alert upon a sudden loss of fuel and/or movement detected by the accelerometer 16 when the engine is off (as sensed by the ignition sensor 526), according to embodiments of the present invention.

A user 124 of a web application interface (e.g. via workstation 122) may, when an alert is received, be provided with an option to display a list of all vehicles and a status of all alert parameters. In some cases, the user may activate a "hot key" or other override function in order to obtain an image displayed on a map indicating the vehicle location when the alert occurs. The web application interface permits the user to specify that the alert notifications should override and/or overlay and/or replace any other display currently displayed on the screen, according to embodiments of the present invention. The web application may also permit the user to select a "hot key" or the like to receive a video image, for example a streaming live image, from the vehicle 101 when an alert occurs. According to other embodiments of the present invention, the web application may receive an alert when the vehicle 101 drives out of radio frequency (e.g. Wi-Fi) range of a particular piece of equipment, for example a defibrillator with Wi-Fi or other radio frequency capability, according to embodiments of the present invention.

As discussed above, the VDM 10 may be communicably coupled to a navigation system 30; alternatively, the VDM 10 hardware enclosure or housing may itself incorporate a global positioning system. The VDM 10 may incorporate directional (for example magnetometer) technology, either integral or indirectly via navigation system 30. The VDM 10 may provide mapping capability, so that remote users 124 of a web application interface may see mapping features, for example current location of the vehicle 101 with respect to surrounding streets and/or landmarks, as well as the location of the vehicle 101 as particular moments in time, including future or predicted locations, in a visual map display, according to embodiments of the present invention.

The VDM 10 may also be configured to activate or deactivate vehicle devices upon receiving a remote command, for example through network 12, using a twelve-volt digital output, according to embodiments of the present invention. The VDM 10 may also be configured to activate or control OEM systems and devices with a remote command from the application software (e.g. the application software hosted by enterprise server 128 and accessed via workstation 122) to the vehicle data bus 20, for example using ODBII and/or J protocols, according to embodiments of the present invention. The VDM 10 may also activate or deactivate vehicle devices using a five volt digital output. The VDM 10 may also activate and/or deactivate devices located within the vehicle 101 based on user-defined parameters, using a twelve or five-volt digital output, according to embodiments of the present invention. This may similarly be accomplished using the vehicle data bus 20. The application software may also turn off driver feedback messaging and/or tones with a remote command, according to embodiments of the present invention. For example, if the VDM 10 sends an alarm to the remote web application interface indicating that a smoke detector 23 has detected smoke in the front cabin 150, the application software may display the smoke alarm to web interface user 124. The web user 124 may access a live video stream, for example from camera position 1, and observe that the driver 112 is smoking a cigarette. The web user 124 may turn off the smoke alarm, and send the driver 112 a voice and/or video message instructing and/or reminding the driver 112 that smoking is not permitted, according to embodiments of the present invention.

According to some embodiments of the present invention, the user, for example a vehicle fleet manager, may set monitoring, audible feedback, violation, grading, and reporting parameters for individual vehicles, groups of vehicles, and/or an entire fleet. Alternative parameters may be specified for situations during which the vehicles 101 are operating in emergency mode, and/or for different identified drivers.

An enterprise user 124 may view high resolution video images showing a driver's eye view, including images taken in low lighting conditions, with a minimum of a 120 degree field of view, out of the front windows (e.g. similar to camera position 8 of FIG. 6), according to embodiments of the present invention. According to some embodiments of the invention, the cameras have a field of view at or between thirty degrees and three-hundred sixty degrees. The enterprise user 124 may also view high resolution, low light, video images of the front of the ambulance, with capability for viewing the driver and an attendee, similar to camera position 1 of FIG. 6. According to some embodiments of the present invention, the VDM 10 collects from video capture device 26 (or multiple video capture devices 26) at least forty-eight hours of video footage without overwrites, such that if overwrites occur, the most recent images will be saved and the oldest images will be overwritten. Other time frames for video footage capture may be used, instead of forty-eight hours. According to embodiments of the present invention, the user 124 of the web application interface may view video images remotely in near real time. The enterprise application server 128 and/or enterprise storage server 126 may be configured to record and save all activities when VDM 10 senses the presence of vehicle ignition and/or speed. The user 124 may view video from one or more camera positions when the vehicle 101 is not running, but is otherwise triggered by a user-defined event, such as accelerometer activity.

According to some embodiments of the present invention, the VDM 10 tags or flags or otherwise marks in the vehicle data record the occurrence of a particular activity or combination of activities. These flags permit a user, for example web application user 124, to quickly locate data of particular interest, either in real time, or when reviewing the vehicle data record. According to some embodiments of the present invention, the VDM 10 write protects the data corresponding to flagged events to prevent the VDM 10 from writing over such data. For example, if a high overforce condition is detected at 11:09 am, the VDM 10 write protects all data corresponding to 11:09 am, and/or all data corresponding to 11:08 am to 11:10 am, and/or certain kinds of data corresponding to a particular time range. The user 124 may also view images taken from the back of the vehicle, for example from camera position 4, displaying backing incidents, loading of patients, and/or rear-end collisions, according to embodiments of the present invention. The driver 112 may be able to view video images in real time taken from the rear of the ambulance to facilitate vehicle backing (e.g. camera position 4). The driver may also be able to view video showing adjacent lane activity in real time, for example images or video taken from video capture devices 26 in one or more of camera positions 5 and 6, according to embodiments of the present invention. The user 124 may also be able to view visual information taken from a rear cabin 152, for example from camera positions 2 and/or 7. The user 124 may be a medical professional, and may view visual information from the patient compartment 152 remotely in order to provide telemedicine or other remote medical advice and/or diagnosis, according to embodiments of the present invention. The rear cabin 152 may also be configured with two-way video capability for this purpose, according to embodiments of the present invention. The VDM 10 may also identify weather conditions, for example based on windshield wiper use, and other external conditions, according to embodiments of the present invention.

The VDM 10 permits video images to be downloaded via Wi-Fi and/or cellular connections, and may select transfer times of such content, taking into account bandwidth, cost, and/or time information. Downloading of video images from VDM 10, for example by enterprise storage server 126, may be toggled between low and high resolution, to facilitate download via cellular network (e.g. for live remote viewing) or Wi-Fi (e.g. for large bandwidth transfer of video images for later viewing). The web application interface provided to user 124 may permit easy access to view video from time stamped or flagged activity referenced from system reports, including tagged activity from a driver-activated panic button. The user 124 may be able to access and view video seamlessly from the web application interface program. As the user 124 is viewing video or image content, the user may be able to toggle on or off the overlay of other data gathered by VDM 10, for example the vehicle speed, whether emergency driving is activated, and the like.

According to some embodiments of the present invention, the user 124 may view a map while viewing video footage, such that the map indicates the vehicle 101 location corresponding to the timing of the video footage. The user 124 may move a representation of a vehicle 101 to various positions along the map in order to scroll to a different position within the data. For example, a user 124 watching video footage from a vehicle's data record may click on a little ambulance icon displayed over the map of the particular route and move it forward along the route, and then unclick the ambulance icon to begin playing video corresponding to the new ambulance icon location along the route. The map display of the route may also include visual indicators that may be toggled on and off, the visual indicators illustrating flagged events. For example, the map may display little red flags at locations along the vehicle route at which overspeed and/or overforce conditions, or other conditions, were logged in the vehicle data record. In such situations, clicking on one of the flags (which may be a visual representation other than a flag shape) retrieves and displays vehicle data corresponding to the particular point in time that was flagged, for example video footage and/or recreation of a vehicle speedometer, according to embodiments of the present invention. Such information may be output, or such information access cues may be interpreted, in other ways; for example, via voice command, retinal scan, or hand gesture, according to embodiments of the present invention.

The VDM 10, as well as the back-end servers 126, 128 and associated programming, may be configured to facilitate the incorporation of data from multiple base station application programs, for example by assigning a location identifier to all records, according to embodiments of the present invention. The application server 128 may be configured to permit a user 124 to build "favorites" screens, in order to default or permit easy recall of commonly viewed screens and/or reports, according to embodiments of the present invention. The VDM 10 may also be configured to detect the presence of "shore power," a power source external to the normal mobile power source of vehicle 101, and determine to keep certain devices or connections active in the presence of shore power that would not normally be kept active when vehicle ignition is not present, according to embodiments of the present invention.

According to some embodiments of the present invention, the VDM 10 determines the existence of a particular condition based on visual information received from one or more video capture devices 26. For example, the VDM 10 may be configured to perform gesture recognition, to determine when an intravenous line is being placed into the patient in the rear cabin 152, or to determine when a person is standing up in the rear cabin 152. Such determinations may trigger a separate data entry into the vehicle data record, and/or may be used by VDM 10 in combination with other signals to determine triggering or flagging events. Such determinations may also be used by the VDM 10 to impact the alerts or warnings delivered to drivers 112 and/or crew members 114; for example, the VDM 10 may be configured to lower the overforce setting such that a lower observed acceleration (e.g. lowest of accelerometer or vehicle speed change rate acceleration) is implemented when a VDM 10 determines that a person is standing in the rear cabin 152; this dynamic overforce or overspeed determination may help to warn the driver 112 against undertaking a normally safe acceleration event that has become potentially less safe due to the fact that a person is standing up in the rear cabin 152, according to embodiments of the present invention. The VDM 10 may also use video data to incorporate "machine vision" or the like, in order to facilitate red light detection, lane departure detection, tail gating detection, and seat belt compliance, for example. The VDM 10 may also be configured to dynamically adjust overforce parameters based on vehicle weight sensors, for example lowering the overforce parameter for a left turn if the vehicle is heavier on the right side. As another example, airport crash rescue trucks, which become top-heavy when they are loaded with water, may have their overforce and overspeed parameters lowered (for example based on the water level) in order to deter potential vehicle rollovers. As another example, if the VDM 10 detects a low tire pressure, it may dynamically lower the overspeed limit. If the VDM 10 detects that the roads are icy, it may also lower the overspeed limit and overforce limit, according to embodiments of the present invention.

The VDM 10 may also use other sensors and/or devices within vehicle 101 to determine the presence of certain conditions, for example, the VDM 10 may infer that it is raining outside if a windshield wiper 506 activation signal is received for longer than a predetermined period of time (e.g. longer than a normal windshield cleansing cycle). The VDM 10 may infer that it is dark outside if the headlights 502 are activated, according to embodiments of the present invention.

According to some embodiments of the present invention, the database 130 includes a national database of driving scores for individual drivers, which may be accessed by one or more subscribers 124 to research a particular driver's driving history. The enterprise application server 128 may also be configured to provide a vehicle burden score, in order to assist enterprise users in optimizing deployment; for example, if a particular vehicle 101, such as an ambulance, has experienced a high amount of wear, it may be deployed for shorter trips than an ambulance that is newer or has just had maintenance performed on it. As such, the application through which an enterprise user 124 interacts with the vehicle record data may permit correlation of scheduling data with vehicle 101 performance and/or maintenance-related data.

The enterprise application server 128 may also be configured to track the particular data and/or types of reports accessed by a particular enterprise user 124 and/or a subscribing organization (e.g. a particular county's fire department), and suggest to the user 124 one or more other reports that are similar, or which similarly-acting users often access. The server 128 may be configured to identify trends in data usage, and/or in the data itself, and displays such trends in textual and/or graphical format. The server 128 may also be configured to display suggestions or recommendations based on trends. For example, if server 128 notices a relatively high number of backing violations, the server 128 may include a graphical button that, when activated on the user's 124 workstation 122, automatically activates a voice message for play by each VDM 10 in the fleet on vehicle ignition, that says "please remember to use a spotter when backing."

The VDM 10 may also be configured to provide a reward and/or incentive system for drivers 112 or crew members 114, according to embodiments of the present invention. For example, when a driver 112 logs in to a particular VDM 10 via crew ID device 14, and the VDM 10 queries database 130 and determines that the driver 112 has a driving safety score that exceeds a user-defined threshold, the VDM 10 may activate the sound system or radio device 510 for entertainment between runs, may activate a seat warmer system, an air conditioning or heating system, or other entertainment or luxury items that are normally optional, but which may be activated as a reward for safe driving. When a driver 112 logs in to the VDM 10, the VDM 10 may display (e.g. via video display device 40 or via a web browser interface when the driver 112 accesses data from a remote workstation 122) a graphic or point reward interface, which may also permit the driver to use points gathered for safe driving scores to redeem prizes or vacation time, according to embodiments of the present invention. The VDM 10 may also be configured to activate a Wi-Fi hot spot for internet access, as a reward for certain safety performance, according to embodiments of the present invention.

According to embodiments of the present invention, a user 124 may be a code reviewer reviewing the vehicle data record, and/or the patient transport record. In such cases, the web application through which the user 124 accesses the vehicle data may permit the user 124 to flag times and/or events which were not previously flagged, for later retrieval and/or for facilitated review. In some cases, the user 124 may be a driver 112 and/or crew member 114, and the web application may authenticate their identity and permit them to review the vehicle data for the runs which they have performed, and/or for the records which involve their performance. According to embodiments of the present invention, the web application may permit the driver 112 and/or crew member 114 to insert annotations or flags into the vehicle data record, for example for explanatory purposes. For example, if the VDM 10 added to the vehicle data record an overforce condition, the driver 112 may be able to go back into the record and add a comment or annotation, which may be in the form of a recorded voice message, a text entry, a flag, and/or the like, to explain that the overforce condition was a result of braking to avoid colliding with another driver who was driving unsafely. According to some embodiments of the present invention, the enterprise workstation 122 is in the vehicle 101, and the driver 112 and/or crew member 114 may edit and/or comment on the vehicle data record shortly after a particular run or a particular shift, while the events are still fresh in memory. Such edits and/or comments may be added directly to the vehicle data record in VDM 10, and/or added to the remote copy of the vehicle data record stored on database 130, according to embodiments of the present invention. The crew member 114 and/or driver 112 may have the ability to delete sections of video under certain circumstances.

According to some embodiments of the present invention, the VDM 10 is configured to receive commands via the audio capture device 28, and/or to transcribe narratives received via the audio capture device 28. For example, the driver 112 says "I am going to give a narrative now," and the VDM 10 interprets this as a command to begin voice-recognized transcription and/or to create a sound file (e.g. a ".wav" file) to enter into the vehicle data record the information recorded. According to some embodiments of the present invention, the VDM 10 uses both gesture and voice command recognition, for example recording a crew member's narrative while flagging and/or bookmarking the points in time when the crew member makes a certain hand gesture, for example raising his or her hand.

According to some embodiments of the present invention, the VDM 10 is configured to build historical data, and/or to feed it back into the VDM's 10 feedback and alert system. For example, if VDM 10 senses an overforce braking event along a particular stretch of road a user-defined number of times, the VDM 10 may automatically adjust the overspeed limit to be lower to ensure that the VDM 10 reminds the driver 112 to slow down going over that stretch of road, in order to avoid additional braking events, according to embodiments of the present invention. Such historical data may also be used by VDM 10 to find an effective speed limit for a particular stretch of road, and/or provide a voice alert, according to embodiments of the present invention.

The VDM 10 may be configured to store data in a recognized or industry standard data format, for example National EMS Information System (NEMSIS) data format, HL7 format, or XML format, and/or the enterprise storage server 126 may be configured to convert the vehicle record data from database 130 into a NEMSIS data format, according to embodiments of the present invention According to some embodiments of the present invention, the VDM 10 is configured to gather vehicle data that may be used for fleet maintenance decisions; for example, the reporting feature of enterprise application server 128 may be configured to associate vehicle safety data with maintenance data or decisions, for example activating a maintenance alert to an enterprise user 124 for a particular vehicle 101 earlier if that particular vehicle 101 has experienced more overforce conditions (e.g. heavy braking) than an average vehicle. The VDM 10 may also be configured to predict in-field failure, for example if a severe drop in battery charge is detected for the vehicle 101, the VDM 10 may be configured to alert the driver 112 and/or crew 114 that a new destination should be selected and/or a backup plan implemented.

According to some embodiments of the present invention, the administration environment 103 collects vehicle data for numerous vehicles owned by multiple different vehicle fleet managers, and the enterprise user 124 is a member of the vehicle manufacturing or insurance industry, who accesses via enterprise workstation 122 some or all of the vehicle data records in order to improve vehicle safety design, and as empirical or "real world" testing data for evaluating vehicle performance over time and under various circumstances. In such cases, any medical or patient or other confidential information may be screened or shielded, but vehicle information may be passed through such a connection in order to permit the user 124 to see historical maintenance and vehicle performance data for one particular vehicle or any number of vehicles over a particular period of time. Such reports may be interactively customized, permitting the user 124 to select the particular field and time frames to view, according to embodiments of the present invention. The web data interface for manufacturing and insurance industry participants may be customized to permit access to data fields that are of particular interest to those industries, for example accelerometer-based information, seatbelt data, weight distribution, tire pressure, engine diagnostics, and the like.

According to some embodiments of the present invention, the VDM 10 is configured to facilitate compliance with wearing hearing protection in situations in which hearing protection is required, by requiring a user confirmation that hearing protection is secured, and/or by processing video imagery to determine whether a user is wearing earmuffs, for example. The VDM 10 may also be configured to perform active noise cancellation, for example on siren sounds received through audio capture device 28, according to embodiments of the present invention. The VDM 10 may also be communicably coupled to a third party headset and/or dispatch system, for example the FireCom™ system, and may be configured to enter into the vehicle data record audio recordings from other channels and/or users (e.g. record in an ambulance VDM 10 audio communications from firefighters who have also responded to the same emergency). The VDM 10 may be communicably coupled to a variety of audio or other multimedia systems in personal protection gear, such as face masks, gloves, hazardous material suits, and/or helmets, according to embodiments of the present invention.

Figure 14:
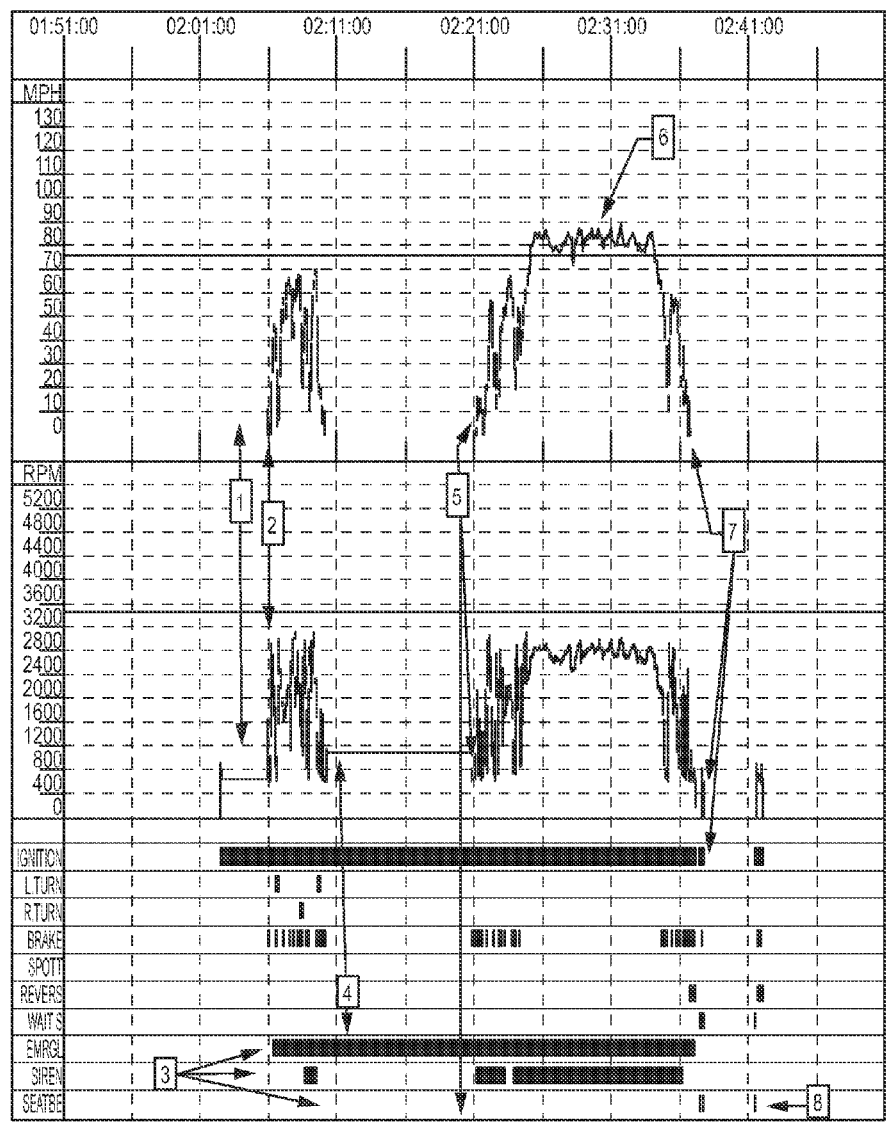
FIG. 14 illustrates a report showing vehicle speed, engine speed, ignition, left turn, right turn, brake activation, spotter switch activation, reverse activation, emergency light activation, siren activation, and driver's seatbelt activation data over a particular length of time corresponding to a run, or an emergency response, according to embodiments of the present invention.

FIG. 14 illustrates a report showing vehicle speed, engine speed, ignition, left turn, right turn, brake activation, spotter switch activation, reverse activation, emergency light activation, siren activation, and driver's seatbelt activation data over a particular length of time corresponding to a run, or an emergency response, according to embodiments of the present invention. Reference number 1 of FIG. 14 illustrates that the crew was at their post, with the vehicle idling with no speed. Reference number 2 illustrates the time when the crew was dispatched; reference number 3 illustrates activation of emergency lights, intermittent use of siren during the response, and the fact that the seatbelt was not fastened. Reference number 4 indicates when the crew was at the scene of the emergency medical event, as the vehicle was in high idle mode, with the emergency lights remaining on at the scene. Reference number 5 indicates that the crew was en route to a hospital destination, transporting the patient with the siren on. Reference number 6 indicates that the vehicle experienced overspeed violations almost ten times at speeds approaching ninety miles per hour while en route. Reference number 7 indicates that the vehicle has arrived at the destination and has been shut off. Reference number 8 reiterates that the driver's seatbelt was not fastened over the run.

Figure 15:
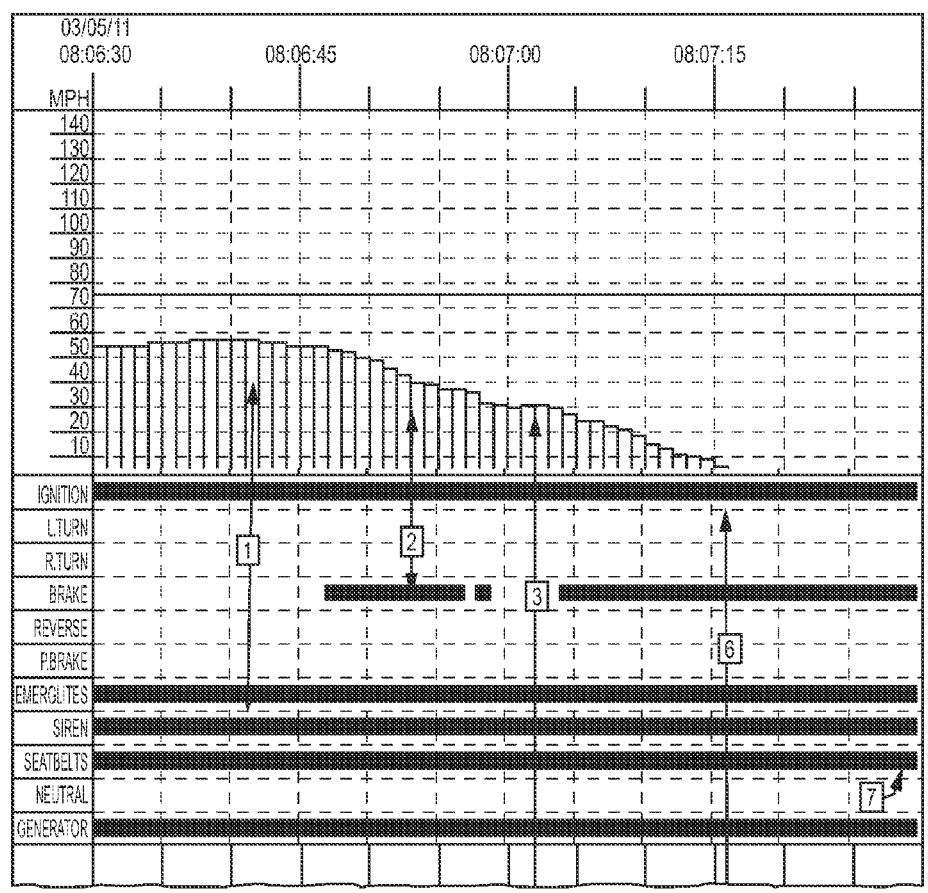
FIG. 15 illustrates a second-by-second report for a particular one-minute time interval surrounding a vehicle accident, showing various data values plotted versus time, according to embodiments of the present invention.
Figure 15:
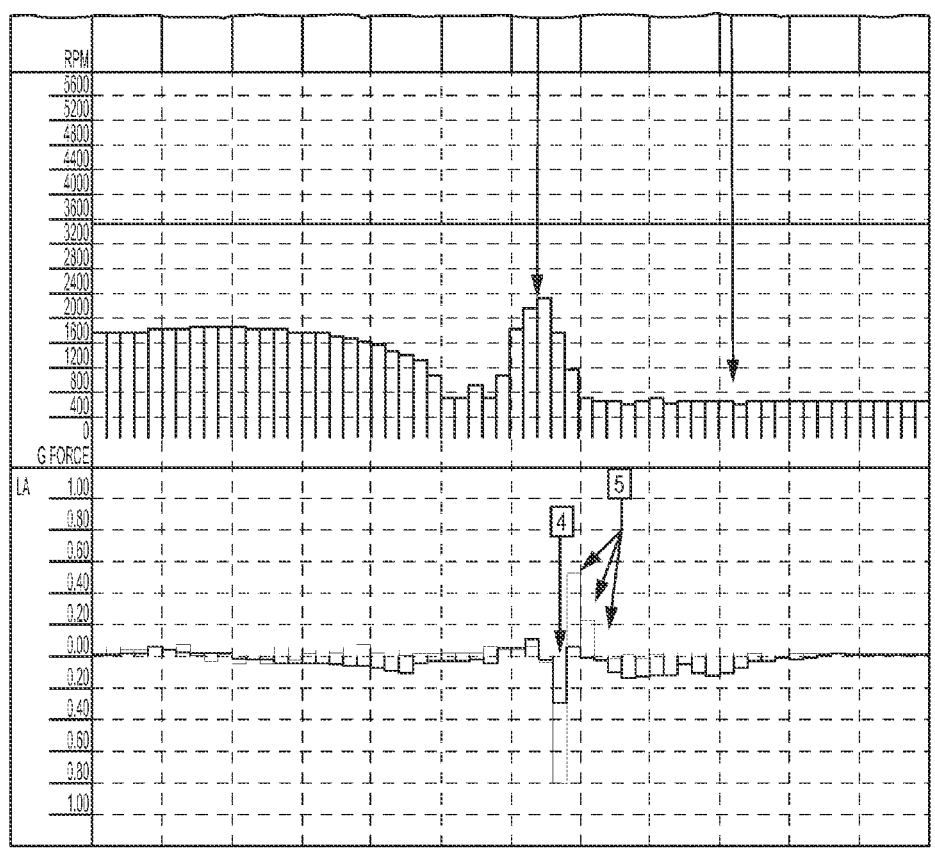

FIG. 15 illustrates a second-by-second report for a particular one-minute time interval surrounding a vehicle accident, showing various data values plotted versus time, according to embodiments of the present invention. Reference number 1 of FIG. 15 illustrates that the vehicle was responding with lights and siren on and vehicle speed at fifty-seven miles per hour. Reference number 2 illustrates that brakes were applied as the vehicle slowed to approach an intersection. Reference number 3 illustrates that the brakes were off, the accelerator activated, and engine speed increasing as the vehicle entered the intersection at thirty-one miles per hour. Reference number 4 illustrates the vehicle being struck on the driver's side, generating a high right overforce condition. Reference number 5 illustrates the vehicle tipping to the right on two wheels and returning to all four wheels. Reference number 6 indicates that brakes were applied and the vehicle comes to a complete stop, and reference number 7 illustrates that the seatbelts were on for the entire duration of the event. FIGS. 14 and 15 illustrate two examples of the various data that may be displayed over particular time periods, for example by the server 128 via a web interface based on a query from an enterprise user, according to embodiments of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for vehicle data management, the method comprising:
receiving an accelerometer signal from an accelerometer mounted in a vehicle;
determining an accelerometer specific force based on the accelerometer signal;
receiving a speed signal from a speed sensor on the vehicle, wherein the speed signal indicates a speed of the vehicle;
determining an instantaneous acceleration of the vehicle by calculating a rate of change of the speed based on the speed signal;
selecting a current observed acceleration as a lower value of the accelerometer specific force and the instantaneous acceleration;
capturing video footage with a camera mounted on the vehicle; and
flagging the video footage corresponding to a time when the current observed acceleration exceeds a preset safe force value.

2. The method of claim 1, wherein the vehicle comprises a front cabin and a rear cabin, wherein the camera is mounted in the rear cabin, and wherein capturing video footage comprises capturing video footage including at least a portion of a patient in the rear cabin.

3. The method of claim 1, wherein the vehicle comprises a front cabin and a rear cabin, wherein the camera is mounted in the rear cabin, and wherein capturing video footage comprises capturing video footage including at least a portion of an emergency services technician in the rear cabin.

4. The method of claim 1, wherein the time is a range of time when the current observed acceleration exceeds a present safe force value.

5. The method of claim 1, further comprising flagging the video footage corresponding to a time when the speed exceeds a preset safe speed value.

6. The method of claim 1, further comprising:
receiving a reverse signal from a reverse activation indicator, the reverse signal indicating whether the vehicle is in reverse drive;
receiving a spotter switch signal from a spotter switch, the spotter switch signal indicating whether a spotter is present behind the vehicle; and
flagging the video footage corresponding to a time when the vehicle is in reverse drive and a spotter is not present.

7. The method of claim 6, wherein the camera is mounted on or near a rear of the vehicle facing in a rearward direction.

8. A system for vehicle data management, the system comprising:
an accelerometer, wherein the accelerometer is mounted in a vehicle and is configured to measure an accelerometer specific force of the vehicle;
a speed sensor, wherein the speed sensor is configured to measure a speed of the vehicle;
a video capture device;

a vehicle data management device communicably coupled to the accelerometer, the speed sensor, and the video capture device, the vehicle data management device configured to establish a vehicle record, wherein the vehicle record comprises video footage captured by the video capture device, wherein the vehicle data management device is further configured to:
  determine an instantaneous acceleration based on a rate of change of the speed of the vehicle,
  determine a current observed acceleration as a lower value of the accelerometer specific force and the instantaneous acceleration,
  mark the vehicle record to indicate a time when the instantaneous acceleration exceeds a preset safe force value.

9. The system of claim 1, wherein the vehicle record comprises the video footage in a vehicle video record, and wherein the vehicle data management device is further configured to mark the vehicle video record to indicate a time when the force value is outside of the safe force range.

10. The system of claim 1, wherein the vehicle data management device is further configured to mark the vehicle video record to indicate range of time when the force value is outside of the safe force range.

11. A method comprising simultaneously:
  displaying a map showing a route taken by a particular emergency vehicle during an emergency medical services event and a representation of the vehicle at a position along the route; and
  displaying video data captured from the emergency vehicle during the emergency medical services event corresponding to a time at which the vehicle was at the position along the route.

12. The method of claim 11, wherein the video data is video footage, wherein displaying the video data comprises playing the video footage, the method further comprising synchronizing moving the representation of the vehicle along the route to correspond to the vehicle position at the time represented by the playing video footage.

13. The method of claim 11, wherein the position is a first position, the method further comprising:
  receiving a request to move the representation of the vehicle to a second position along the route;
  updating the map to show the representation of the vehicle at the second position; and
  based on the request, displaying the video data corresponding to the time at which the vehicle was at the second position.

14. A system for vehicle data management, the system comprising:
  a driver identification device located on an emergency vehicle, the driver identification device configured to receive an indication of an identity of a current driver of the emergency vehicle, wherein the emergency vehicle has a front cabin configured to seat the current driver, and a rear cabin configured to accept a patient and at least one emergency medical technician;
  an accelerometer located on the emergency vehicle, the accelerometer configured to indicate a specific force undergone by the emergency vehicle;
  a speed sensing device located on the emergency vehicle, the speed sensing device configured to indicate a speed of the emergency vehicle;
  a video capture device located in the rear cabin and configured to capture visual information about the rear cabin; and
  a vehicle data management device communicably coupled to the driver identification device, the accelerometer, the speed sensing device, and the video capture device, the vehicle data management device configured to establish a vehicle record, wherein the vehicle record comprises video footage captured by the video capture device, wherein the vehicle data management device is further configured to:
    determine whether one or both of the specific force and the speed fall outside of certain ranges, and
    create a flag in the vehicle record based on the determination.

15. The system of claim 14, wherein the video capture device is a first video capture device, and wherein the driver identification device is a second video capture device located in the front cabin and configured to receive visual information about the current driver.

16. The system of claim 14, wherein the driver identification device is a magnetic card reader.

17. The system of claim 14, wherein the driver identification device is an RFID transceiver.

18. The system of claim 14, further comprising a seatbelt sensor configured to indicate fastening of a seatbelt, the vehicle data management device further configured to determine whether the seatbelt is not fastened, and create the flag in the vehicle record based on the determination.

19. The system of claim 14, further comprising a spotter switch configured to indicate presence of a backing spotter, and a reverse activation signal configured to indicate whether the vehicle is in reverse drive, the vehicle data management device further configured to determine whether the backing spotter is not present, and create the flag in the vehicle record based on the determination.

20. The system of claim 14, further comprising an audio device, wherein the vehicle data management device is further configured to play an audio message with the audio device based on the determination.

* * * * *